(12) United States Patent
Hawke et al.

(10) Patent No.: US 11,386,548 B2
(45) Date of Patent: Jul. 12, 2022

(54) METHOD, APPARATUS AND COMPUTER PROGRAM PRODUCT FOR STORING IMAGES OF A SCENE

(71) Applicants: Sony Corporation, Tokyo (JP); Sony Europe B.V., Weybridge (GB)

(72) Inventors: Edward Hawke, Basingstoke (GB); James Sharam, Basingstoke (GB)

(73) Assignees: Sony Corporation, Tokyo (JP); Sony Europe B.V., Weybridge (GB)

( * ) Notice: Subject to any disclaimer, the term of this patent is extended or adjusted under 35 U.S.C. 154(b) by 226 days.

(21) Appl. No.: 16/827,157

(22) Filed: Mar. 23, 2020

(65) Prior Publication Data

US 2020/0311898 A1 Oct. 1, 2020

(30) Foreign Application Priority Data

Mar. 26, 2019 (GB) ..................................... 1904182

(51) Int. Cl.
| | |
|---|---|
| *G06K 9/00* | (2022.01) |
| *G06T 7/00* | (2017.01) |
| *G06F 16/583* | (2019.01) |
| *G06T 5/50* | (2006.01) |

(52) U.S. Cl.
CPC ............ *G06T 7/001* (2013.01); *G06F 16/583* (2019.01); *G06T 5/50* (2013.01)

(58) Field of Classification Search
CPC ......... G06T 7/001; G06T 5/50; G06F 16/583; G06F 16/783; G06F 16/55; G06F 16/75; G06V 20/00; G06V 20/40; H04N 7/181
See application file for complete search history.

(56) References Cited

U.S. PATENT DOCUMENTS

| | | | |
|---|---|---|---|
| 2006/0200475 A1* | 9/2006 | Das .......................... | G06F 16/58 |
| 2010/0128919 A1 | 5/2010 | Perrennin et al. | |
| 2010/0189409 A1* | 7/2010 | Brasnett .................. | G06V 20/40 |
| | | | 386/278 |
| 2011/0119293 A1 | 5/2011 | Taylor et al. | |
| 2012/0207386 A1* | 8/2012 | Ofek ....................... | G11B 27/00 |
| | | | 382/168 |
| 2013/0124508 A1 | 5/2013 | Paris et al. | |

FOREIGN PATENT DOCUMENTS

GB  2 211 293  *  7/2010

* cited by examiner

*Primary Examiner* — Samir A Ahmed

(74) *Attorney, Agent, or Firm* — Oblon, McClelland, Maier & Neustadt, L.L.P.

(57) ABSTRACT

A method of storing images of a scene, including receiving an image of a scene, generating at least one image identifier of the image, which is indicative of content of the image, storing the at least one image identifier of the image in association with temporal information for that image in a first storage, determining a degree of similarity between content of the image and previous images which have been received based on a correspondence between the at least one image identifier of the image and the at least one images identifiers of the previous images in the first storage, and storing the at least one image identifier of subsequently received images in a second storage in association with temporal information corresponding to a first previous image when the determined degree of similarity between the image and the first previous image exceeds a predetermined threshold.

8 Claims, 8 Drawing Sheets

METHOD, APPARATUS AND COMPUTER PROGRAM PRODUCT FOR STORING IMAGES OF A SCENE

BACKGROUND

Field of the Disclosure

The present disclosure relates to a method, apparatus and computer program product for storing images of a scene, and a method apparatus and computer program product for image processing.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

In recent years, there has been a vast increase in the resolution of images which are captured by image capture devices. Furthermore, the frame rate at which image capture devices are capable of capturing images of a scene has also been increasing. The increase in the frame rate and resolution of image capture devices has led to a substantial increase in the computational resources required to store, transmit and process the images from these image capture devices. Notably, image capture systems comprising multiple image capture devices have particularly high computational demands.

Often, images of a scene may be obtained from a plurality of image capture systems and devices. For example, images of a scene may be captured from a number of distinct image capture devices in a closed circuit television camera (CCTV) system, a number of user devices, a number of cameras belonging to different television broadcasters, or the like. That is, a number of distinct image capture devices may be present at a certain scene or location, and each of those image capture devices may capture an image of the scene from a certain angle. In other words, each of the image capture devices may capture an image comprising a different view of the scene.

In certain situations it may be advantageous to collate or analyse the stream of images of the scene which have been captured by the different devices. However, owing to certain limitations in the computational resources which are available, collation or the images from the different image capture devices can be difficult to achieve. This is particularly difficult where it is necessary to perform processing on the images in a substantially real time environment. Substantially real time analysis of the images may be required, for example, at sporting events or the like. That is, in sporting events users expect that a number of features are available based on a substantially real time analysis of the images of the scene.

Furthermore, in some situations, it can be difficult to collate and analyse images of a scene which have been captured by image capture devices of different specifications. For example, certain image capture devices may capture images of a scene at high frame rates, and integration with the images obtained from lower frame rate sources may be difficult to achieve. In addition, efficient storage of the images obtained from a plurality of image capture devices in this manner can be challenging.

Accordingly, in situations such as these, it can be difficult to collate and analyse the different images of the scene which have been captured by a range of image capture devices.

It is an aim of the present disclosure to address these issues.

SUMMARY

According to embodiments of the disclosure, a method of storing images of a scene is provided, the method comprising receiving an image of a scene; generating at least one image identifier of the image, the at least one image identifier being indicative of the content of the image; storing the at least one image identifier of the image in association with temporal information for that image in a first storage; determining a degree of similarity between the content of the image and previous images which have been received based on a correspondence between the at least one image identifier of the image and the at least one images identifiers of the previous images in the first storage; and storing the at least one image identifier of subsequently received images in a second storage in association with temporal information corresponding to a first previous image when the determined degree of similarity between the image and the first previous image exceeds a predetermined threshold.

According to embodiments of the disclosure, an apparatus for storing images of a scene is provided, the apparatus comprising circuitry configured to receive an image of a scene; generate at least one image identifier of the image, the at least one image identifier being indicative of the content of the image; store the at least one image identifier of the image in association with temporal information for that image in a first storage; determine a degree of similarity between the content of the image and previous images which have been received based on a correspondence between the at least one image identifier of the image and the at least one images identifiers of the previous images in the first storage; and store the at least one image identifier of subsequently received images in a second storage in association with temporal information corresponding to a first previous image when the determined degree of similarity between the image and the first previous image exceeds a predetermined threshold.

According to embodiments of the disclosure, a computer program product comprising instructions which, when the program is executed by the computer, cause the computer to carry out a method of storing images of a scene is provided, the method comprising receiving an image of a scene; generating at least one image identifier of the image, the at least one image identifier being indicative of the content of the image; storing the at least one image identifier of the image in association with temporal information for that image in a first storage; determining a degree of similarity between the content of the image and previous images which have been received based on a correspondence between the at least one image identifier of the image and the at least one images identifiers of the previous images in the first storage; and storing the at least one image identifier of subsequently received images in a second storage in association with temporal information corresponding to a first previous image when the determined degree of similarity between the image and the first previous image exceeds a predetermined threshold.

According to embodiments of the disclosure, a method of image processing is provided, the method comprising receiving a second image stream; identifying the second image stream has a frame rate above a predetermined threshold; determining a degree of similarity between the images of the second image stream and images of a previously received first image stream; and inserting at least one image of the second image stream into a respective portion of the first image stream in accordance with the determined degree of similarity between the images.

According to embodiments of the disclosure, an apparatus for image processing is provided, the apparatus comprising circuitry configured to receive a second image stream; identify the second image stream has a frame rate above a predetermined threshold; determine a degree of similarity between the images of the second image stream and images of a previously received first image stream; and insert at least one image of the second image stream into a respective portion of the first image stream in accordance with the determined degree of similarity between the images.

According to embodiments of the disclosure, a computer program product comprising instructions which, when the program is executed by the computer, cause the computer to carry out a method of image processing is provided, the method comprising: receiving a second image stream; identifying the second image stream has a frame rate above a predetermined threshold; determining a degree of similarity between the images of the second image stream and images of a previously received first image stream; and inserting at least one image of the second image stream into a respective portion of the first image stream in accordance with the determined degree of similarity between the images.

According to embodiments of the disclosure, efficient storage and synchronisation of the image of the scene can be obtained. Of course, it will be appreciated that the present disclosure is not particularly limited to these advantageous effects, there may be others.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
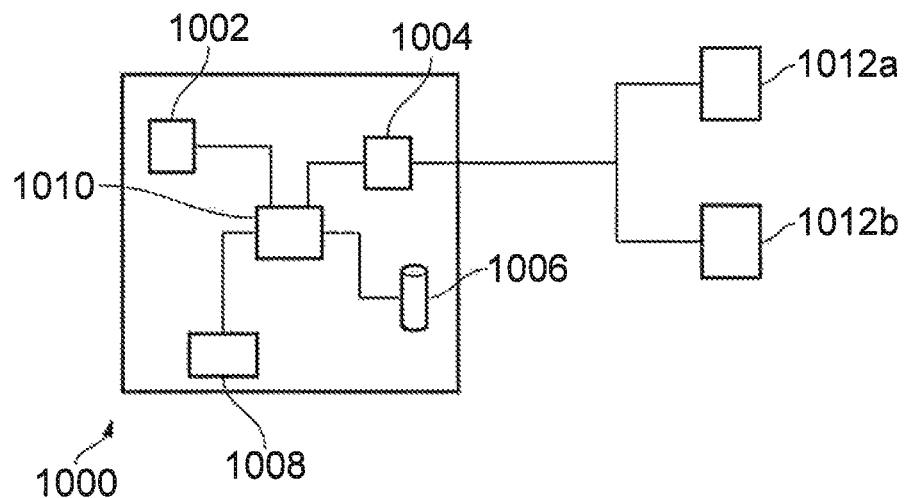
FIG. 1 illustrates an apparatus according to embodiments of the disclosure.

Referring now to the drawings, wherein like reference numerals designate identical or corresponding parts throughout the several views.

FIG. 1 illustrates an apparatus according to embodiments of the disclosure. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1010.

The processing circuitry 1010 might, for example, comprise a microprocessor carrying out computer instructions or might, for example, be an Application Specific Integrated Circuit. The computer instructions are stored on storage medium 1006 which may be a magnetically readable medium, optically readable medium or solid state type circuitry. The storage medium 1006 may be integrated into the apparatus 1000 (as shown) or may, alternatively, be separate to the apparatus 1000 and connected thereto using either a wired or wireless connection. The computer instructions may be embodied as computer software that contains computer readable code which, when loaded onto the processor circuitry 1010, configures the processor circuitry 1010 to perform a method according to embodiments of the disclosure. Additionally connected to the processor circuitry 1010, is a user input unit 1002. The user input unit 1002 may be a touch screen or may be a mouse or stylist type input device. The user input 1002 may also be a keyboard or any combination of these input devices.

Communication circuitry 1004 is also coupled to the processing circuitry 1010. The communication circuitry 1004 may provide a connection to a Local Area Network or a Wide Area Network such as the Internet or a Virtual Private Network or the like. For example, the communication circuitry 1004 may be connected to broadcasting infrastructure allowing the processor circuitry 1010 to communicate with other devices or infrastructure equipment in order to obtain or provide relevant data. The communication circuitry 1004 may therefore be behind a firewall or some other form of network security.

Furthermore, as shown in FIG. 1, the communication circuitry 1004 may be connected to a plurality of image capture devices 1012a and 1012b. Although shown separate from the apparatus 1000, the plurality of image capture devices 1012a and 1012b may additionally be integrated into the apparatus 1000. When separate from the apparatus 1000, the plurality of image capture devices 1012a and 1012b may be connected to the device 1000 through the communication circuitry 1004 by either a wired or wireless connection. It will be appreciated that the form of the image capture devices 1012*a* and 1012*b* is not particularly limited. However, the image capture devices 1012*a* and 1012*b* may capture still images of a target object, or may capture a stream of images forming a video of the target object.

Alternatively or in addition, the image capture devices 1012*a* and 1012*b* may be further configured to capture sound from the scene. The image captured by the image captured device 1012*a* and 1012*b* may, for example, be a high resolution image or a 4K image of the target object.

Furthermore, while only two image capture device 1012*a* and 1012*b* are shown, it will be appreciated that the present disclosure is not particularly limited in this regard, and any number of image capture device may be communicatively coupled with apparatus 1000 as required.

Additionally coupled to the processing circuitry 1010, is a display device 1008. The display device 1008, although shown integrated into the apparatus 1000, may additionally be separate to the apparatus 1000 and may be a monitor or some kind of device allowing the user to visualise the operation of the system. In addition, the display device 1008 may be a printer or some other device allowing relevant information generated by the apparatus 1000 to be viewed by the user or by a third party.

Identifying New Images in an Image Stream:

A method of identifying new images of a scene is provided in accordance with embodiments of the disclosure. The method of identifying new images of a scene may be applied to a situation such as identifying new images captured from a plurality of image capture devices located around a scene. That is, for example, the method according to embodiments of the disclosure may be applied to an example situation where images are captured at a sporting event such as a football (soccer) match or the like. As such, embodiments of the disclosure will be described with reference to this example situation. However, it will be appreciated that the present disclosure is not particularly limited in this regard, and may alternatively be applied to any such situation whereby identification of new images in a stream of images is required.

Figure 2:
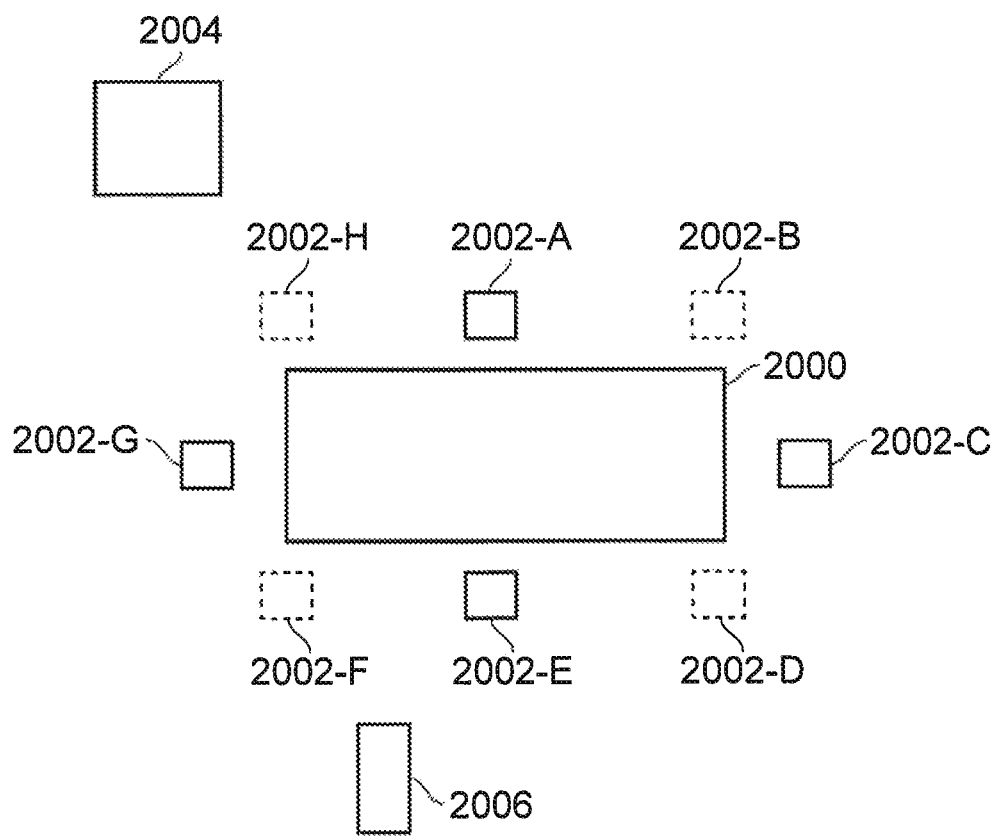
FIG. 2 illustrates an example image capture scene in accordance with embodiments of the disclosure.

Now, FIG. 2 illustrates an example image capture scene in accordance with embodiments of the disclosure.

In FIG. 2, a number of image capture devices 2002-A to 2002-H are provided at a number of locations around a scene 2000. That is, each of the image capture devices 2002-A to 2002-H is arranged such that the image capture device captures an image of the scene 2000 from a certain viewpoint of the scene. In this example, the scene 2000 is an area such as a football (soccer) pitch, rugby pitch or the like. Now, it will be appreciated that the present disclosure is not particularly limited to the number and/or location of image capture devices shown in the example of FIG. 2. Rather, any number of image capture devices may be provided as required.

Furthermore, the form and type of the image capture devices 2002-A to 2002-H are not particularly limited in the present disclosure, and may vary in accordance with the situation to which the embodiments of the disclosure are applied. In this situation whereby the image capture devices 2002-A to 2002-H are located at a sporting event, the image capture devices may be high performance image capture devices which each capture a stream of high resolution, or 4K, images of the scene.

Now, in this example, image capture devices 2002-A, 2002-C, 2002-E and 2002-G are communicatively coupled to an apparatus 2004. That is, in this example, only a subset of the image capture devices which are present at the scene are communicatively coupled to the apparatus 2004. In this example, the subset of image capture devices to which apparatus 2004 is communicatively coupled, and will thus directly receive images of the scene, may be determined in advance, based on limitations regarding the transmission of the images to apparatus 2004. For example, the total number of cameras from which apparatus 2004 can receive a live stream of images may be limited in accordance with the bandwidth of the connection between apparatus 2004 and the plurality of image capture devices, the resolution of the image capture devices, the frame rate of the image stream captured by those image capture devices, or the like.

Image capture devices 2002-A, 2002-C, 2002-E and 2002-G may be communicatively coupled to apparatus 2004 by any wired or wireless connection. As such, in this example, apparatus 2004 receives the stream of images captured by image capture devices 2002-A, 2002-C, 2002-E and 2002-G directly from the image capture devices in substantially real time. However, it will be appreciated that the present disclosure is not particularly limited in this regard. That is, the images may be pre-processed prior to their transmission to apparatus 2004, for example.

It will be appreciated that apparatus 2004 is an apparatus such as that described with reference to FIG. 1 above. Furthermore, it will be appreciated that images are transmitted to apparatus 2004 such that apparatus 2004 can perform substantially real time analysis on the images of the scene. In this example situation, the apparatus 2004 may perform, or assist in performing, analysis such as the analysis required for a Video Assistant Referee, or the like.

As noted above, owing to certain limitations, only a subset of the image capture devices 2002-A to 2002-G are communicatively coupled to apparatus 2004. However, the number of image capture devices communicatively coupled to apparatus 2004 is not particularly limited to the number shown in this example situation, and may vary in accordance with the situation to which the embodiments of the disclosure are applied.

Now, while only images from a subset of the available image capture devices are provided to the apparatus 2004, it will be appreciated that all of the image capture devices 2002-A to 2002-G may be capturing a stream of images of the scene. Accordingly, at any given time certain image views obtained from image capture devices 2002-B, 2002-D, 2002-F and 2002-H may be unavailable to the apparatus 2004. However, in this example, a broadcaster 2006 is located at the scene. In fact, it will be appreciated that the present disclosure is not particularly limited in this regard, and a number of broadcasters may be present at the scene. In this example, broadcaster 2006 may receive image streams from all the image capture devices 2002-A to 2002-G which are present at the scene. In other examples, the broadcaster 2006 may only receive images from a subset of the image capture devices 2002-A to 2002-G. However, it will be appreciated that broadcaster 2006 receives images from the image capture devices which are unavailable to apparatus 2004.

Now, in this example, broadcaster 2006 is an entity which receives images from the scene and provides those images to consumers. That is, in this example, broadcaster 2006 provides images of the sporting event which have been captured by the image capture devices 2002-A to 2002-G such that the sporting event can be watched by consumers. In other words, the broadcaster 2006 transmits a program comprising an image feed obtained from the image capture devices in substantially real time, such that the consumers can watch the sporting event on consumer devices, such as a television.

It will be appreciated that the manner in which the broadcaster 2006 transmits the images is not particularly limited, and may comprise digital broadcasting, satellite transmission, cable transmission or transmission over the internet, for example.

Of course, while in this example broadcaster 2006 receives images from the plurality of image capture devices 2002 which are present at the scene, it will be appreciated that, in this example, the broadcaster 2006 selects images from a given camera for transmission at any given time. That is, in this example, the broadcaster 2006 transmits images from a single image capture device, such as image capture device 2002-D, at a single instant in time, such that the consumers watching the program transmitted by the broadcaster 2006 see a single view of the scene at a given instant in time. However, in this example, the broadcaster 2006 dynamically selects the image capture device 2002 from which the images will be transmitted in accordance with the action which is occurring in the sporting event. For instance, at a first time during the sporting match, the broadcaster 2006 may transmit images from image capture device 2002-D. However, at a second time during the sporting match, the broadcaster 2006 may subsequently transmit images from a second image capture device 2002-H. Of course, the present disclosure is not particularly limited in this regard, and the image capture devices 2002 from which the broadcaster 2006 transmits images may vary in accordance with the situation.

Now, since broadcaster 2006 is transmitting the images in substantially real time, communication circuitry of apparatus 2004 can receive the images from the broadcaster 2006 in addition to the images received from the image capture devices to which it directly communicatively coupled. In other words, apparatus 2004 receives a stream of images comprised of images from two distinct sources. Namely, images received directly from the subset of image capture devices 2002A, 2002-C, 2002-E and 2002-G and images received from the transmission of broadcaster 2006. That is, it will be appreciated that while apparatus 2004 directly receives images from only a subset of the image capture devices present at the scene, apparatus 2004 also indirectly receives images transmitted by the broadcaster 2006.

Accordingly, apparatus 2004 is configured such that it receives a first stream of images of the scene, the first stream of images comprising images obtained from at least one camera, or image capture device, and images obtained from at least one transmission source.

Now, since in this example the broadcaster 2006 may transmit images from any of the image capture devices 2002-A to 2002-G, it will be appreciated that the broadcaster 2006 may, at a certain instant of time, transmit images of the scene from an image capture device with which the apparatus 2004 receives a direct image feed. Accordingly, at certain instances of time, apparatus 2004 may receive the same image directly from an image capture device 2002 located at the scene and indirectly from the transmission of the broadcaster 2006. Alternatively, the image received from the transmission of the broadcaster 2006 may provide apparatus 2004 with an additional view of the scene. As such, according to embodiments of the disclosure, for each instance in time it is desirable that apparatus 2004 determines whether the image from the transmission of the broadcaster 2006 provides an additional view of the scene.

However, since the apparatus 2004 is required to perform analysis of the images in substantially real time, it can be difficult to analyse the content of the images which have been received in order to determine whether or not the images received from the transmission of the broadcaster 2006 provide a different view of the scene.

As such, according to embodiments of the disclosure, the apparatus 2004 generates at least one identifier for each image in the first stream of images, the at least one identifier being indicative of the content of the image.

That is, for each image which is received, both directly from the image capture devices 2002 and from the transmission of the broadcaster 2006, the apparatus 2004 computes at least one identifier which is indicative of the content of the image. The at least one identifier is determined based on a property of the image content of each image, and can be used to represent the content of that image. In other words, the at least one image identifier provides an efficient numerical representation of every image which is received by the apparatus 2004.

According to certain examples, said image identifier may be determined based upon a hash of the image content. That is, according to embodiments of the disclosure, a hash function may be performed on the image content in order to obtain a hash value based on the visual content of the image. Said hash function may be executed by performing a discrete cosine transform of the image, for example. Moreover, in certain examples, a 64 bit hash function can be performed on the image content. Furthermore, in certain examples, a perceptual hash may be generated such that images with the same, or similar, image content will have the same, or similar, hash values (or image identifiers). In fact, a number of distinct image identifiers for a given image may be generated, each image identifier indicative of a certain portion of the content of the image. However, it will be appreciated that the present disclosure is not particularly limited in this regard, and any suitable function which produces an identifier which can be used to analyse the content of the image can be used in accordance with embodiments of the disclosure.

As such, according to embodiments of the disclosure, for every image received by the apparatus 2004, an individual image identifier is generated.

Figure 3:
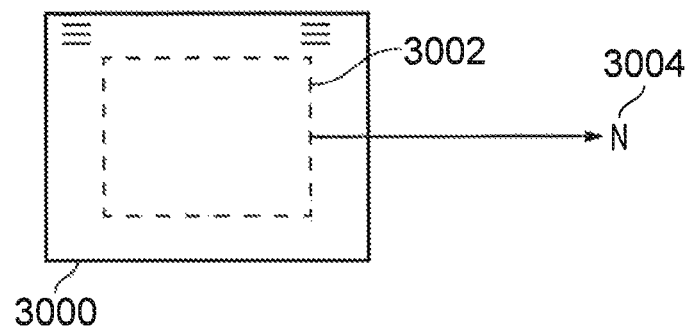
FIG. 3 illustrates an example of generating an image identifier in accordance with embodiments of the disclosure.

Generating Identifiers:

FIG. 3 illustrates an example of generating an identifier (image identifier) in accordance with embodiments of the disclosure.

As noted above, for each image which apparatus 2004 receives an image identifier is generated. The image identifier is indicative of the content of the image. That is, in certain examples, the image identifier may be generated based on the content of the entire image. However, in other situations, the image identifier may be generated based upon a selected portion of the image.

Consider the example image 3000 shown in FIG. 3, for example. In this situation, image 3000 is an image which has been received by apparatus 2004. Furthermore, in this example, image 3000 is received from a transmission by the broadcaster 2006. Accordingly, image 3000 is not a direct image of the scene 2000 illustrated with reference to FIG. 2. Rather, in this example, broadcaster 2006 has inserted additional graphics and overlays on image 3000 prior to transmission. However, it will be appreciated that the present disclosure is not particularly limited in this regard and image 3000 may have been received one of the plurality of image capture devices 2002.

Now, it will be appreciated that the graphics and overlays will impact the value of the image identifier which is obtained for image 3000. Consider, for example, that apparatus 2004 receives a first copy of image 3000 directly from image capture device 2002-A (without any additional graphics), and also receives a second copy of image 3000 from the same image capture device 2002-A from a transmission of the broadcaster 2006 (with the additional graphics and overlays). In this situation, the presence of the graphics and overlays in the image from the broadcaster 2006 may cause a different image identifier to be obtained for the two images, even though the actual image content, absent the graphics or overlay, of the two images is the same.

Accordingly, in this example, it is advantageous that the image identifier is generated based upon a selected portion 3002 of the image 3000. The selected portion 3002 is a clean portion of the image having no graphics or overlays, such as those inserted on the image by the broadcaster 2006. In some examples, the selected portion, or region, which is to be used when generating the image identifier of the image may be determined in advance (such as an area where it is determined that no graphics or overlays will be inserted by the broadcaster 2006). This selected region of the image may then used when determining the image identifier for all images received by the apparatus 2004.

As such, the same image identifier will be generated for images of the same content from the received directly from the image capture devices and from the broadcaster 2006. In other words, generating the image identifier based on a selected sub-region of the image ensures that overlays from the broadcaster 2006 do not interfere with image identification. Furthermore, producing the image identifier for a selected portion of the image may reduce the processing load for apparatus 2004, thus further improving the performance of apparatus 2004 when identifying new images of the scene in accordance with embodiments of the disclosure. Accordingly, subsampling the images which are received may be particularly advantageous when a large number of images are received by apparatus 2004.

Alternatively or in addition, the image identifier for the image may be generated on a subsampled version of the image content. That is, when an image is received by apparatus 2004, directly from the image capture devices 2002 or indirectly from the broadcaster 2006, the apparatus 2004 may produce a sub-sampled version of that image and subsequently generate the image identifier for the sub-sampled version of the image. For example, a low-pass or bandpass filter could be applied to the image which has been received by apparatus 2004 in order to reduce the image resolution of the image which has been received. Alternatively or in addition, image processing techniques could be performed on the image which has been received by apparatus 2004 in order to perform luminance or chroma sub-sampling of the image. It will be appreciated that the present disclosure is not particularly limited in this regard, and any form of image sub-sampling prior to generating the image identifier may be used in accordance with the situation to which the embodiments of the disclosure are applied.

Generating the image identifier on the sub-sampled images reduces the processing load for apparatus 2004, thus further improving the performance of apparatus 2004 when identifying new images of the scene in accordance with embodiments of the disclosure. Accordingly, subsampling the images which are received may be particularly advantageous when a large number of images are received by apparatus 2004.

Returning now to the example situation of FIG. 2. In this example, it will be appreciated that images are received from the plurality of image capture devices 2002 and the broadcaster 2006 in a continual stream of individual images. Accordingly, the image identifier for each image of the stream is generated by apparatus 2004 in substantially real time as each image is received. Furthermore, for each image, once the image identifier for the image has been generated, apparatus 2004 stores the image identifier in a storage unit. That is, according to embodiments of the disclosure apparatus 2004 may be configured to store the at least one identifier for each image of the first stream of images in a storage. Of course, the form and location of this storage is not particularly limited and will vary in accordance with the situation to which the embodiments of the disclosure are being applied. For example, the image identifier could be stored within a storage such as storage medium 1006 described with reference to FIG. 1. Alternatively, the image identifier for each image could be stored in an external storage unit accessible to apparatus 2004. That is, the present disclosure is not particularly limited in this regard.

Storage of Image Identifiers

Figure 4:
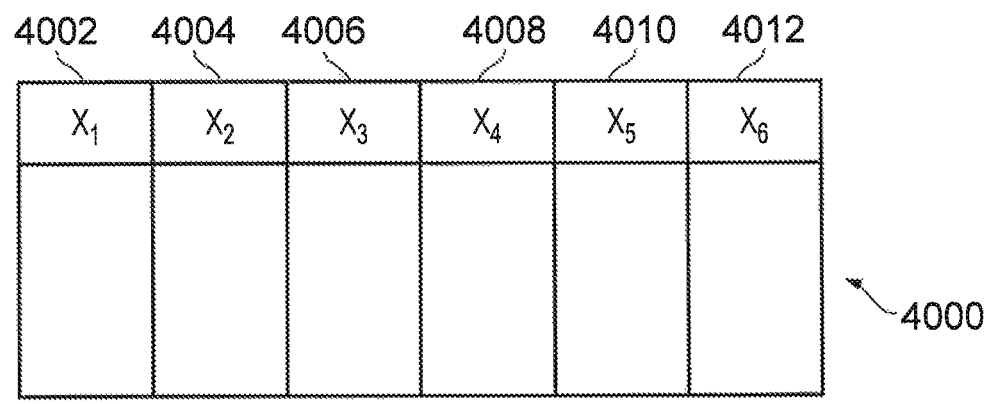
FIG. 4 illustrates an example of storing an image identifier in accordance with embodiments of the disclosure.

FIG. 4 illustrates an example of storing an image identifier in accordance with embodiments of the disclosure. Of course, it will be appreciated that the example shown in FIG. 4 is just one example of the manner in which the image identifier can be stored in accordance with embodiments of the disclosure, and that the present disclosure is not particularly limited in this regard.

Now, in the example of FIG. 4, the image identifier for each image is stored in a database 4000. That is, in this example, column 4002 of database 4000 stores the at least one image identifier which has been generated for each image which has been received. Columns 4004 to 4012 store additional information for each image. That is, in some examples, whereby more than one image identifier has been generated for each image, a number of columns 4004 to 4012 could be used to store the additional image identifiers for each image.

Alternatively or in addition, columns 4004 to 4012 could be used to store information regarding the image source of the image. That is, in the example described with reference to FIG. 2 of the present disclosure, the source of the image could indicate whether the image has been received directly from the image capture devices 2002 or whether the image has been received from a transmission from the broadcaster 2006. In fact, in certain examples, the information indicative of the source of the image may comprise information indicative of the respective image capture device of the at least one image capture device from which the image is obtained. That is, in the example situation described with reference to FIG. 2, when the image has been received from an image capture device 2002, the information indicating the source of the image could indicate which image capture device of the plurality of image capture device 2002 captured the image of the scene.

Now, it will be appreciated that in certain examples, when the image is received from the broadcaster 2006, apparatus 2004 may not have access to information indicating which image capture device of the plurality of image capture devices obtained the image of the scene. That is, the broadcaster 2006 may transmit the image of the scene without providing information regarding which image capture device 2002 captured the image of the scene 2000. As such, according to embodiments of the disclosure, apparatus 2004 may be configured in order to determine whether the image received from the broadcaster 2006 corresponds to an image received directly from the plurality of image capture devices, such that the source of the image obtained from the broadcaster 2006 can also be determined.

Consider the example described with reference to FIG. 2 of the present disclosure. In this example, apparatus 2004 receives images directly from image capture devices 2002-

A, 2002-C, 2002-E and 2002-G. However, the broadcaster 2006 can transmit images from any of the plurality image capture devices 2002 present at the scene 2000. As such, at a first instance in time, the image received from the broadcaster 2006 may correspond to an image received directly from the subset of image capture device 200-A, 2002-C, 2002-E and 2002-G with which apparatus 2004 is communicatively coupled. However, at a second instance in time, the image received from the broadcaster 2006 may correspond to an image from an image capture device, such as image capture device 2002-D, with which the apparatus 2004 does not directly receive images.

As such, when storing the image identifiers which have been generated for the images which have been received, apparatus 2004 may determine whether the image received from the broadcaster 2006 corresponds to an image received from the plurality of image capture devices 2002 from which the apparatus 2004 directly receives images.

In order to perform this comparison, apparatus 2004 may be configured to determine a degree of similarity between the content of the image obtained from the at least one transmission source (the broadcaster 2006) and the content of the images obtained from the at least one image capture device (the image capture devices 2002-A, 2002-C, 2002-E and 2002-G) based on a correspondence between the at least one identifier generated for the image obtained from the at least one transmission source and the at least one identifiers generated for the images obtained from the at least one image capture device.

That is, since the image identifiers which are generated by the apparatus 2004 are indicative of the content of the image, the image identifiers can be used in order to determine whether or not an image received from the broadcaster 2006 corresponds to an image received directly from the subset of image capture devices with which apparatus 2004 is communicatively coupled. In certain examples, similar images, having similar image content, will have similar image identifiers.

Accordingly, apparatus 2004 may identify the image obtained from the broadcaster 2006 as equating to an image obtained from the subset of image capture devices 2002-A, 2002-C, 2002-E and 2002-F in accordance with the determined degree of similarity of the image. For example in certain situations, apparatus 2004 may equate the image from the broadcaster 2006 with an image obtained from the subset of image capture devices 2002-A, 2002-C, 2002-E and 2002-F when the determined degree of similarity is greater than a predetermined threshold limit. Of course, it will be appreciated that the level of the predetermined threshold is not particularly limited and depends upon the specifics of the situation.

In other words, according to embodiments of the disclosure, when an image comes from the transmission of the broadcaster 2006, the apparatus 2004 searches all the images obtained from the available camera feeds at that instant in time, using the image identifiers which have been generated, in order to efficiently identify the source of the image transmitted by the broadcaster 2006 (that is, which image capture device it originated from). When an image identifier is found within a certain tolerance then apparatus 2004 identifies the image from the broadcaster 2006 as coming from that image capture device. In some examples, if multiple image identifiers are found within a certain tolerance, then the closest image identifier (corresponding to the best matching image capture device) will be identified as the source of the image from the broadcaster 2006.

In contrast, when no image identifier is found within the predetermined tolerance, then apparatus 2004 concludes that the image from the broadcaster 2006 originates from an image capture device 2002 with which apparatus 2004 is not communicatively coupled (such as image capture device 2002-D). In this case, no further information regarding the source of the image from the broadcaster 2006 can be obtained by apparatus 2004 at this stage.

Accordingly, according to embodiments of the disclosure, certain information regarding the source of the image received by apparatus 2004 may be determined. This information may be stored by apparatus 2004 in association with the image identifier for each image as that image is received.

Of course, as noted above, the present disclosure is not particularly limited in this regard, and any method of storing the image identifier for each image which is received may be used in accordance with the situation to which the embodiments of the disclosure are applied.

In other words, regardless of the manner of storage, it will be appreciated that, in accordance with the embodiments of the disclosure, the image identifiers generated for each image are stored such that apparatus 2004 can efficiently access the image identifiers of the previous images at a later stage as required.

Second Stream of Images:

Returning now to the example described with reference to FIG. 2 of the present disclosure. In this example, apparatus 2004 is receiving a first stream of images as the sporting event unfolds. That is, apparatus 2004 is receiving images from the subset of the plurality of image capture devices (2002-A, 2002-C, 2002-E and 2002-G) and images from the broadcaster 2006.

In this example, at a certain stage during the sporting event, an incident may occur which interrupts the passage of the sporting event. That is, an event may occur during the sporting event which requires an interruption of play. In this specific example, such an event may correspond to a player who is playing in the sporting event scoring a goal, engaging in potentially foul play or the like. At this stage, a request may be received by apparatus 2004 to perform certain analysis on the images of the event in order to verify that said event has occurred.

That is, a request may be received such that apparatus 2004 performs substantially real time analysis on the images of the scene 2000. In the specific example situation of a football (soccer) match, the apparatus 2004 may perform, or assist, analysis required for a Video Assistant Referee in order to determine whether a goal has been scored by a player. However, it will be appreciated that the present disclosure is not particularly limited in this regard. Of course, the type of event will depend upon the situation.

When such an event occurs, it will be appreciated that the broadcaster 2006 may transmit a replay of the action in the moments leading up to the event. That is, the broadcaster 2006 may transmit an action replay of the event which has interrupted the sporting event. Primarily, this replay may be provided by the broadcaster 2006 such that consumers can see the event of interest in more detail. However at this stage apparatus 2004 may receive images of the scene from a previous time (replay images) from the transmission of the broadcaster 2006 in addition to the live feed from the subset of image capture devices 2002-A, 2002-C, 2002-E and 2002-G.

In other words, at this stage, apparatus 2004 receives a second stream of image of the scene obtained from the at least one transmission source (the broadcaster 2006).

At this stage, it may be advantageous for apparatus 2004 to identify that the images received from the broadcaster 2006 form the second stream of images. This information could be obtained based on the presence or reception of a flag indicative of the second stream of images, for example.

However, it will be appreciated that the method of identifying that images received from the broadcaster 2006 correspond to images of the second stream of images (the replay images) is not particularly limited, and any such method may be used in accordance with embodiments of the disclosure.

Typically the broadcaster 2006 will play an animation to symbolise the start and end of a replay. Accordingly, apparatus 2004 can be configured to detect that the image feed from the broadcaster 2006 has cut to a replay when an image or set of images corresponding to that animation are identified within the stream of images received from the broadcaster 2006.

Figure 5:
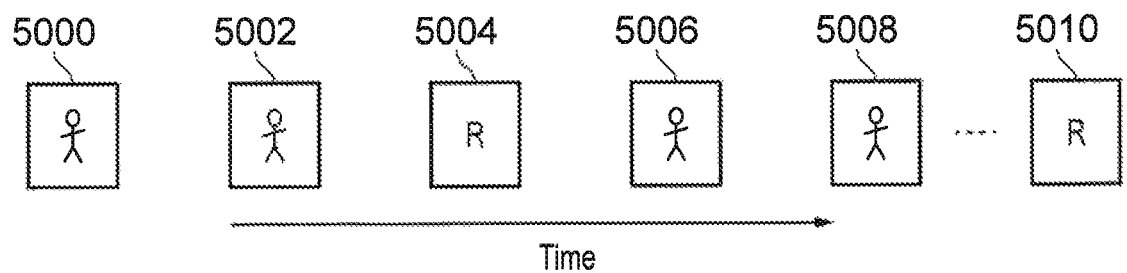
FIG. 5 illustrates an example of identifying a second stream of images in accordance with embodiments of the disclosure.

FIG. 5 illustrates an example of identifying a second stream of images in accordance with embodiments of the disclosure. In this example, images 5000 to 5010 correspond to a stream of images transmitted by a broadcaster 2006. Each of the images 5000 to 5010 corresponds to an image of the scene 2000 captured by the plurality of image capture device 2002.

Now, in this specific example shown in FIG. 5, images 5000 and 5002 are sequentially transmitted by the broadcaster 2006 and correspond to a live (or substantially real time) transmission of the image captured by an image capture device (such as image capture device 2002-B) located at the scene. Accordingly, a consumer who is viewing the images transmitted by the broadcaster 2006 will, at this time, see a live transmission of the sporting event (that is, a live transmission of the images of the scene 2000).

At a certain time during the live transmission, an event may occur during the sporting event which causes the broadcaster 2006 to determine to transmit a replay of images of the scene which have been captured. That is, the broadcaster 2006 may determine to transmit images which have been captured from the plurality of image capture devices at an earlier time during the sporting event. In other words, when the broadcaster 2006 determines to transmit a replay, the images transmitted by the broadcaster 2006 do not correspond to live images from the scene 2000. Rather, when the broadcaster 2006 determines to transmit a replay, the images correspond to images which have been captured from the plurality of image capture devices 2002 at an early stage during the sporting event.

It will be appreciated that the images shown by the broadcaster 2006 during a replay transmission do not necessarily correspond to the images which have been previously transmitted by the broadcaster 2006 from the plurality of image capture devices 2002. That is, during the live transmission, the broadcaster 2006 must make a selection of which image capture device of the plurality of image capture devices 2002 present at the scene 2000 to transmit the image from. For example, during live transmission, the broadcaster 2006 may transmit an image from image capture device 2002-B. However, during the replay, the broadcaster 2006 may determine to show images of the event of interest which were captured from a different image capture device (such as image capture device 2002-F, for example). Accordingly, in this manner, the broadcaster 2006 may transmit a replay of the event from a previously unseen view of the scene. In fact, during the replay, the broadcaster 2006 may subsequently transmit images from a plurality of views of the scene. In this case, some of the replay images may correspond to images which were originally transmitted live by the broadcaster 2006, while some of the images may correspond to images which have not yet been transmitted by the broadcaster 2006 (even though they were captured by the image capture devices 2002 at the time).

As described above, in order that the consumer is aware that a replay is being shown, the broadcaster 2006 may transmit an image indicating that the transmission from the broadcaster 2006 has switched to a replay (as opposed to a live stream of the event). An example image indicating the start of the replay 5004 is shown in FIG. 5. In some examples, the image 5004 may comprise an entire image frame indicating the start of a replay. Alternatively, the image 5004 may comprise a small image overlaid on any image, or part thereof, of a replay which is transmitted by the broadcaster 2006. Alternatively, image 5004 may comprise a short animation indicative of the start or end of the replay. The present disclosure is not particularly limited in this regard. However, once the start of a replay has been indicated, any subsequent images 5006, 5008 transmitted by the broadcaster 2006 are replay images of the scene 2000, until the end of the replay has been signalled.

In this example, when the broadcaster 2006 has transmitted all the replay images which the broadcaster 2006 determines they wish to transmit, the broadcaster 2006 will then transmit an image 5010 indicating that the replay is over and that the transmission has returned to a live stream of the scene 2000 obtained from the plurality of image capture devices.

Returning to FIG. 2, it will therefore be appreciated that apparatus 2004 can be configured to identify the start of the transmission of a second stream of images from the broadcaster 2006 (the transmission source) in accordance with a flag indicating that the images received from the transmission source form the second stream of images (the replay).

In certain examples, as described above, the apparatus 2004 may be configured to determine that the second stream of images have been received based on a flag received from the broadcaster 2006 themselves. However, in certain examples, a user of apparatus 2004 may manually toggle whether the images received from the broadcaster 2006 comprise the second stream of images. These may be provided through a user input device 1002 as described with reference to FIG. 1 of the present disclosure. That is, a user (or operator) monitoring the images received from the broadcaster 2006 may manually instruct apparatus 2004 that the image feed received from the broadcaster 2006 is in a replay mode.

However, when the flag is received in the images transmitted by the broadcaster 2006 (as described with reference to FIG. 5 of the present disclosure) apparatus 2004 may be configured to determine a degree of similarity between the content of the images obtained from the broadcaster 2006 and the content of an image of the flag (such as image 5004) based on a correspondence between the at least one identifier generated for the images obtained from the broadcaster 2006 and at least one identifier which has been generated and stored in advance for the image of the flag. Accordingly, the apparatus 2004 may be configured to determine the start, and end, of the transmission of the second stream of images (the replay in this specific example) in accordance with the determined degree of similarity of the image received from the broadcaster 2006 and the image of the predetermined flag.

However, as noted above, the present disclosure is not particularly limited in this regard, and any suitable method of determining that the images received from the broadcaster 2006 correspond to the second image stream may be used in accordance with the situation to which the embodiments of the disclosure are applied.

Unseen Replay:

Returning now to FIG. 2, when the second stream of images are received (either prior to the determination that those images form the second stream of images, or after it has been determined that the images form the second stream of images) apparatus 2004 generates at least one identifier for each image in the second stream of images.

Now, it will be appreciated that the method of generating the at least one identifier for each image is the same as that described with reference to FIG. 3 of the present disclosure. That is, the at least one image identifier is generated by the apparatus 2004 in the same manner as the at least one image identifier for the first stream of images, and is generated such that it is indicative of the content of the image. For example, the at least one image identifier may comprise a hash of the image content. Moreover, in certain examples, the at least one image identifier may be performed on a sub-region, such as a central portion, of the image. Alternatively or in addition, the at least one image identifier may be generated on a sub-sampled version of the image in the second stream of images.

As such, it will be appreciated that for each image in the second stream of images, apparatus 2004 generates at least one image identifier of the image, the at least one image identifier being indicative of the visual content of that image.

Now, consider the example situation in FIG. 2. As described above, during live transmission (the first stream of images) apparatus 2004 receives images directly from only a subset of the image capture devices 2002-A, 2002-C, 2002-E and 2002-G. Furthermore, during live transmission, apparatus 2004 receives images which have been transmitted by broadcaster 2006. However, in this example, at any instant of time during live transmission, broadcaster 2006 may transmit images from only a first image capture device (such as image capture device 2002-B). Accordingly, during live transmission, apparatus 2004 may not, in this example, have received any images from image capture devices 2002-D, 2002-F or 2002-H. Accordingly, images of the scene 2000 may have been captured from these image capture devices 2002-D, 2002-F and 2002-H, which provide a view of the scene which has not been received by apparatus 2004 in live transmission for that instant in time.

However, as noted above, during a replay, the broadcaster 2006 may sequentially transmit images from a number of different views of the scene, including images from an image capture device 2002-D, 2002-F and/or 2002-G from which apparatus 2004 has not at that instant in time received any images. Accordingly, the second stream of images transmitted by the broadcaster 2006 may comprise additional views or images of the scene which were not provided in the first stream of images. These images which were previously unavailable to apparatus 2004 may contain important information regarding the scene. That is, in this example described with reference to FIG. 2 of the present disclosure, the images which were previously unavailable to apparatus 2004 may comprise important information regarding the event which has occurred during the sporting event. Accordingly, any images previously unavailable to apparatus 2004, that is, any new images, should be rapidly identified such that they can be utilized by apparatus 2004 when providing the substantially real time analysis of the scene 2000. Moreover, in certain examples, images of the second stream of images which have previously been available to apparatus 2004 in the first stream of images should be identified and ignored in order to reduce the level of resource required to analyse the images.

In other words, once a second stream of images has been received, such as the replay images transmitted by broadcaster 2006, the apparatus 2004 starts to determine for each image which is received whether or not the image of the second stream of images is a new image which was not contained in the first stream of images.

As such, according to embodiments of the disclosure apparatus 2004 determines, for each image of the second stream of images, a degree of similarity between the content of the image of the second stream and the content of the images of the first stream of images in order to determine whether or not the image in the second stream of images is a new image of the scene. According to embodiments of the disclosure, this determination is based on a correspondence between the at least one identifier generated for the image of the second stream and the at least one identifiers in the storage.

That is, for each image in the second stream of images, the apparatus 2004 determines a degree of similarity between the content of the image in the second stream of images and the content of the previous images which were received in the first stream of images (during the live transmission of the images, in this specific example).

It will be appreciated that in many situations it is desired that apparatus 2004 determines the degree of similarity between the content in a substantially real time environment. In certain examples, the determination of the correspondence between the at least one identifier generated for the image of the second stream and the image identifiers of the first stream in the storage may be determined based upon a calculation of the Hamming distance between the respective identifiers. In this case, the Hamming distance indicates the number of differing bits between the two image identifiers. The smaller the Hamming distance, the greater the level of similarity between the two images. The level of tolerance around the Hamming distance (that is, the required level of similarity) between the image identifier of the two images should be set in accordance with the specific situation to which the embodiments of the disclosure are applied.

As such, in certain examples, an image of the second stream of images may be identified as corresponding to an image in the first stream of images when the Hamming distance between the respective image identifiers is below a certain threshold.

However, it will be appreciated that the present disclosure is not particularly limited in this regard. Rather, apparatus 2004 may be configured to identify an image of the second stream of images as a new image of the scene in accordance with the determined degree of similarity of the image.

It will be appreciated that the actions of the apparatus 2004 when new images have been identified in the second stream of images is not particularly limited. That is, in certain examples, the apparatus 2004 may store the new images, or the image identifier associated with that image, in the storage. Alternatively or in addition, in certain examples, apparatus 2004 may create a notification, flag or bookmark identifying the location of the new image in the second stream of images. Alternatively or in addition, the apparatus 2004 may display the new image or images which have been identified in the second stream of images on a display for inspection by a user or operator of apparatus 2004. In other words, the actions of the apparatus 2004 when a new image has been identified will vary in accordance with the situation to which the embodiments of the disclosure are applied.

However, it will be appreciated that according to embodiments of the disclosure, every time an image is received in the second stream of images which was not available to apparatus 2004 in the first stream of images, apparatus 2004 can identify that the image is a new image and incorporate this new image into any subsequent analysis of the image. Moreover, because images in the second stream of images which have been received in the first stream of images can be rapidly identified, the need for additional computational resources to process and analyse these repeated images in the second stream of images can be reduced.

Consider the example situation described with reference to FIG. 2 according to embodiments of the present disclosure. In this example, during the live stream of images (the first stream of images) apparatus 2004 does not receive any images from image capture device 2002-D. However, during a stage whereby the broadcaster 2006 transmits a live action replay of the scene (that is, the second stream of images), apparatus 2004 receives images from the image capture device 2002-D. According to embodiments of the disclosure, apparatus 2004 can rapidly identify the images from image capture device 2002-D as new images of the scene. These images can thus be included in any subsequent analysis performed alongside the images received in the first stream of images.

It will be appreciated that in certain examples, it may be desirable that the apparatus 2004 identifies each image of the second stream of images which has not been received in the first stream of images as a new image of the scene. That is, in certain examples, it may be desirable that apparatus 2004 individually flags, bookmarks or notifies every new image of the scene which is identified in the second stream of images. However, when the number of images received in the second stream of images is large (owing to a high frame rate of the image capture devices, for example) it may be desirable that the apparatus 2004 identifies a block of consecutive new images received in the image stream, and flags, bookmarks or notifies the block of new images which have been identified. Furthermore, identifying a block of new images in this manner may reduce spurious identification of a single new image of the scene, whereby that image is identified as a new image because the image has become distorted prior to the generation of the respective image identifier by apparatus 2004.

As such, according to embodiments of the disclosure, when a new image of the scene is identified in the second stream of images, apparatus 2004 may be configured to store an indication for each image in the second stream of images identified as a new image of the scene and identify the second stream of images as comprising a view of the scene not contained in the first stream of images when a number of new images in the second stream of images exceeds a threshold value.

In certain examples, the indication that a new image has been identified may be stored in a database such as that illustrated with reference to FIG. 4 of the present disclosure. That is, the indication that an image of the second stream of images has been identified as a new image of the scene may be stored in association with the image identifier which has been generated for that image. However, it will be appreciated that the present disclosure is not particularly limited in this respect.

Furthermore, in certain examples, the number of new images used to identify that the second stream of images comprises a view of the scene not contained in the first stream of images may be determined based on a number of consecutive new images identified in the second stream of images. That is, if the number of consecutive new images in the second image stream exceeds a threshold value, then it can be determined that the images of that portion of the second stream of images comprise a view, or views, of the scene which are not contained in the first stream of images.

Consider the example described with reference to FIG. 2. When the number of consecutive new images in the second stream of images exceeds a predetermined threshold value, it can be determined that the images in the second stream (the replay transmitted by broadcaster 2006 in this example) correspond to images from an image capture device from which apparatus 2004 did not receive images (either directly from the image capture devices 2002 or indirectly from the broadcaster 2006) during the first stream of images.

Of course, while described with reference to the number of consecutive images in this specific example, the present disclosure is not particularly limited in this regard. That is, for example, the number compared to the threshold used to identify an unseen view of the scene may be the total number of new images detected in the second stream of images, the number of new images received within a given window of time, or the like. Any such number can be used in accordance with embodiments of the disclosure as required depending on the situation.

For example, in one specific example of the present disclosure, images from the second stream of images may be flagged as new images (or a new view or views of the scene) which were not contained in the first stream of images when less than a certain percentage of the images received in the second stream of images are recognised images of the scene. However, when more than a certain percentage of images received in the second stream of images are recognised (that is, correspond to an image identifier in the storage within a predetermined threshold) then the images will not be flagged as new images, or new views, of the scene.

According to certain embodiments of the disclosure, the apparatus 2004 may be configured to display at least one new image of the scene which has been identified for verification by a user. Apparatus 2004 may display the at least one new image of the scene which has been identified using a display device such as display device 1008 described with reference to FIG. 1 of the present disclosure. However, it will be appreciated that the present disclosure is not particularly limited in this respect, and any suitable display device either external or internal to the apparatus 2004 may be used as required in accordance with the situation.

Figure 6:
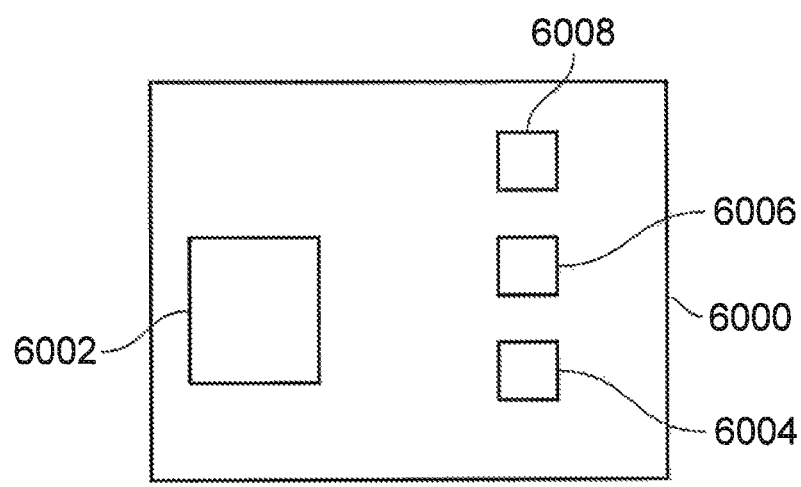
FIG. 6 illustrates an example of identifying a new image in a stream of images in accordance with embodiments of the disclosure.

FIG. 6 illustrates an example of identifying a new image in a stream of images in accordance with embodiments of the disclosure. In this example, an image 6000 is output by apparatus 2004 once the new images in the second stream of images have been identified.

In this example, image region 6002 shows an expanded view of the images from the first stream of images of the scene. That is, the images of the scene received from the first stream of images may be consecutively displayed in image region 6002 in the form of a video of the scene or the like. Furthermore, new images, or new views, of the scene which have been identified in the second stream of images may be displayed in image regions 6004, 6006 and 6008 of image 6000. In this manner, the image from the first image stream and new images from the second image screen can be viewed by an end user or operator of apparatus 2004.

As noted above, according to certain embodiments of the disclosure, these images may be view by the end user or operator of apparatus 2004 with a view to verifying the new images. In certain examples, verification of the new images may comprise verifying that the new images of the scene have been reliably identified by apparatus 2004. Alternatively or in addition verification of the new images may comprise verifying the content of the new images themselves. For example, at a sporting event such as a football (soccer) match, a rugby match, or the like, the new images which have been identified could be displayed to a Video Assistant Referee in order that the Video Assistant Referee can assist in officiating the action of the sporting event. In this manner, new images from the second stream, which were not originally received by apparatus 2004 in the first image stream, can be used when officiating the sporting event in a substantially real time environment.

Of course, the form of the output of apparatus 2004 is not particularly limited in this regard. Moreover, in certain examples, apparatus 2004 may automatically analyse the images from the first image stream of images and the new images from the second stream of images without displaying those images to the end user or operator of apparatus 2004. For example, apparatus 2004 may perform the verification of the new images of the scene with or without display of the new images. Alternatively or in addition, apparatus 2004 may perform verification of the new images in addition to the verification performed by the user.

Detecting Scene Changes:

As noted above, the second stream of images received by apparatus 2004 from the broadcaster 2006 may comprise images from a number of different image capture devices 2002. In the example situation of a sporting event for example, the broadcaster 2006 may transmit a number of views of a certain event, as captured by a number of image capture devices 2002, in succession. For example, the broadcaster 2006 may transmit a close up view of an event, followed by a wide action view of the event. Alternatively or in addition, the broadcaster 2006 may first transmit a view of a certain event, such as potential foul play, from a side angle. Then, the broadcaster 2006 may transmit a view of the same event as captured from above. In other words, the second stream of images transmitted by the broadcaster 2006 may comprise images of an event obtained from a number of distinct angles or locations around the scene.

Now, images of some of those views transmitted by the broadcaster 2006 may have been received by apparatus 2004 in the first stream of images. However, in some cases, the broadcaster 2006 may consecutively or sequentially transmit images from a number of views which have not been received by apparatus 2004 in the first stream of images of the scene. Since these images have not been received in the first stream of images, the block of new images will be flagged by apparatus 2004. However, in a situation whereby a single replay section contains multiple unseen replays (that is, multiple consecutive replays from different image capture devices forming different views of the scene) it may be desirable to split the block of new images into individual image blocks each corresponding to an unseen view of the scene. In other words, it may be desirable to detect a change of view in a stream of images, such as a stream of unseen images, such that each new block of images can be individually identified by apparatus 2004.

Figure 7A:
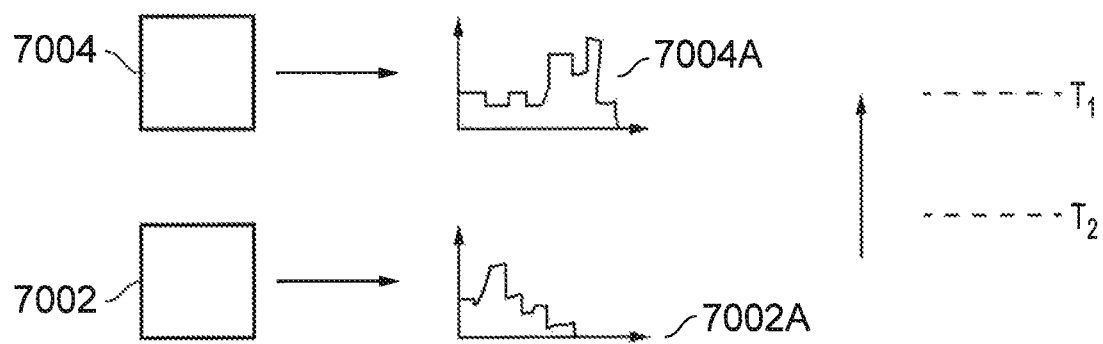
FIG. 7A illustrates an example of detecting a change of view in a stream of images in accordance with embodiments of the disclosure.

FIG. 7A illustrates an example of detecting a change of view in a stream of images in accordance with embodiments of the disclosure.

In this example, apparatus 2004 has received a first image 7002 and a second image 7004 in a stream of images. The stream of images may correspond to the first or second stream of images as described above, depending on the situation. However, in this specific example, images 7002 and 7004 have been received by the apparatus 2004 in the second stream of images from broadcaster 2006 (that is, during a live action replay or the like). Furthermore, in this specific example, apparatus 2004 has identified image 7002 and image 7004 as new images of the scene. That is, apparatus 2004 has identified image 7002 and 7004 as images which were not contained in the first stream of images. In this example, at this stage, it is desired that apparatus 2004 determines whether or not image 7002 and image 7004 correspond to images from the same image capture device, or alternatively, whether image 7002 and image 7004 correspond to individual replays from different image capture devices. In other words, it is desired that apparatus 2004 determines whether images 7002, 7004 correspond to different views of the scene.

Of course, it will be appreciated that while only two images 7002 and 7004 are illustrated in this specific example, the present disclosure is not particularly limited in this regard, and may alternatively be applied to any number of images of the scene as required.

Now, once the images 7002 and 7004 have been identified as new images of the scene, according to embodiments of the disclosure, apparatus 2004 is configured to cross correlate the content of image 7002 and 7004 in order to identify whether a change in scene has occurred.

For example, in certain situations, detecting a scene change may comprise generating a histogram for each image in the second stream of images and identifying a change of view in the second stream of images based on the histograms generated for the second stream of images. That is, in this example, for each of the images 7002 and 7004 apparatus 2004 generates a histogram 7002A and 7004A respectively.

The mechanism used to generate the histograms 7002A and 7004A, and the precise form of those histograms, is not particularly limited in accordance with the present disclosure. However, in this specific example histogram 7002A and 7004A provide a graphical representation of the overall content of an image. In certain situations, each histogram could provide a graphical representation of the tonal distribution of images 7002 and 7004 respectively. In this case, generating the histogram would comprise plotting the total number of pixels in the respective image for each tonal value. Alternatively or in addition, apparatus 2004 could generate the histograms 7002A and 7004A based on the luminance of the respective images 7002 and 7004. In fact, any such histogram can be generated by apparatus 2004 as required in accordance with embodiments of the disclosure. However, it will be appreciated that the histogram which is generated by apparatus 2004 provides a graphical representation of a portion of the image content which can be used by apparatus 2004 in order to rapidly identify whether images 7002 and 7004 relate to the same view of the scene 2000.

Furthermore, it will be appreciated that while, in this specific example, apparatus 2004 is described as generating the histogram 7002A and 7004A based for the whole image 7002 and 7004, the present disclosure is not particularly limited in this regard. That is, the histograms 7002A and 7004A could be produced for a selected region of the images 7002 and 7004, such as the central region of these images, as described with reference to FIG. 3 of the present disclosure.

Once the histograms have been generated, apparatus 2004 is configured to correlate each image histogram with the image histogram of the previous image, and identify a change of view in the second stream of images when a result of the correlation is above a threshold limit. That is, in this specific example described with reference to FIG. 7A, apparatus 2004 is configured to correlate image histogram 7004A with image histogram 7002A in order to determine whether there has been a change in the scene between image 7002 and 7004. The method of performing the correlation of the histograms in accordance with the present disclosure is not particularly limited. For example, a normalised cross correlation method could be used in certain example situations. However, it will be appreciated that when the difference between the two histograms 7002A and 7004A as computed by this correlation exceeds a threshold limit (T2 in this specific example) then it can be determined that there has been a sharp change in scene between the images 7002 and 7004. Accordingly, new images 7002 and 7004 can be identified as belonging to different views of the scene. That is, when there is a sharp change between the histograms 7002A and 7004A, apparatus 2004 can determine that a cut, or scene change, in the new images of the scene identified in the second stream of images has occurred.

In other words, in this example, threshold limit T2 corresponds to a strict threshold which can be used to determine that a switch between images capture devices has occurred in the second stream of images.

However, in certain examples, it will be appreciated that a broadcaster 2006 may transmit images where the scene change between image 7002 and 7004 is performed as a gradual scene change (and not a sharp cut between images from a first and second image capture device). For example, during a live action replay, corresponding to the second image stream in this example, the broadcaster 2006 may use a dissolving image or the like across a number of image frames in order to make transitions between the two views of a scene more gradual and attractive to a consumer. However, a gradual transition may fall beneath the strict threshold T2 and thus may not be identified as a scene change by apparatus 2004.

In order to address this issue, a dual threshold technique can be implemented in accordance with embodiments of the disclosure.

That is, according to certain embodiments of the disclosure, when the result of the correlation for an image is below a first threshold limit (the strict threshold, T2 in this specific example) but above a second threshold limit (a relaxed threshold limit, T1 in this specific example), apparatus 2004 is configured to correlate the image histogram for that image with the image histogram with a plurality of preceding images and identify a change of view in the second stream of images when a result of the correlation is above the first threshold limit. In this manner, if it is determined that the histogram for image 7004 is substantially different from any of a plurality of frames preceding image 7004 in the second stream of images, then a scene change has occurred even if, owing to a gradual transition, the difference between histogram 7004A and 7002A does not exceed the strict threshold limit T2.

Now, it will be appreciated that the level of the strict threshold T2, the relaxed threshold T1 and the number of preceding frames which are included in the comparison are not particularly limited and may vary in accordance with embodiments of the disclosure.

Figure 7B:
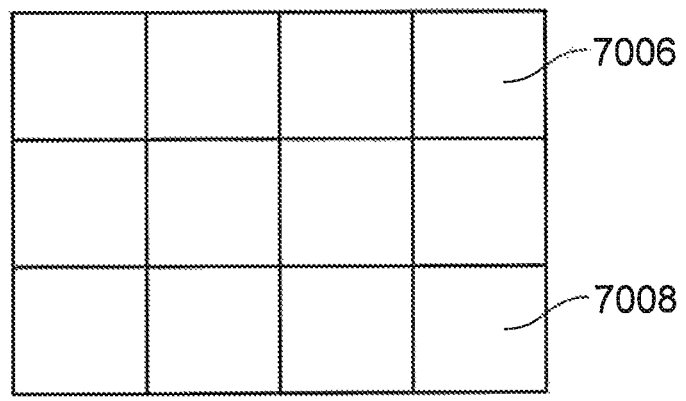
FIG. 7B illustrates an example of detecting a change of view in a stream of images in accordance with embodiments of the disclosure.

FIG. 7B illustrates an example of detecting a change of view in a stream of images in accordance with embodiments of the disclosure. The example illustrated in FIG. 7B can also be used in situations whereby it is desired that gradual transitions between views transmitted by broadcaster 2006 are identified by apparatus 2004.

In this example, each image received in the second image stream, such as image 7004 described with reference to FIG. 7A of the present disclosure, is divided into a number of disjoint sub-regions (such as sub-regions 7006 and 7008). Of course, the number of sub-regions is not particularly limited to the number shown in this specific example, and may vary in accordance with the situation to which the embodiments of the disclosure are applied.

Now, for each sub-region, a histogram of the image is produced. Similarly, for the preceding image (image 7002 in this specific example) a histogram for each sub-region is produced. Then, the histogram of each sub-region is correlated with the histogram of the sub-region in the preceding frame.

According to embodiments of the disclosure, an indication is recorded for each sub-region of the image for which the result of the correlation exceeds the strict threshold T2. For each sub-region whereby the result of the correlation exceeds a relaxed threshold T1 but not the strict threshold T2, an indication is also recorded when a result of correlating that sub-region with the corresponding sub-region in any of a plurality of preceding, or ensuing, frames exceeds said strict threshold T2.

Then, in this example, when a certain percentage of the sub-regions of an image have recorded an indication that the strict threshold T2 has been exceeded, apparatus 2004 will determine that a scene change has occurred. In contrast, if fewer than a said certain percentage of sub-regions record an indication that the strict threshold T2 has been exceeded, then it will be determined that no scene change has occurred in between the images.

Accordingly, in this manner, the dual threshold and sub-region technique described above enables apparatus 2004 to accurately and efficiently determine that a gradual transition between the images of the second stream of images has occurred over multiple frames. In this manner, a block of new images in the second stream of images can be split into individual image blocks each corresponding to an unseen view of the scene.

Of course, it will be appreciated that while embodiments of the disclosure have been described with reference to the example situation of a sporting event illustrated in FIG. 2, the present disclosure is not particularly limited in this regard. That is, embodiments of the disclosure may be applied to any situation whereby collation of the images from a number of different image capture devices in a substantially real time environment is desired. For example, embodiments of the disclosure could be applied to images from a number of different image capture systems including images received from closed circuit television (CCTV) camera systems or the like.

Hence, more generally, a method of identifying new images of a scene is provided in accordance with embodiments of the disclosure, as described with reference to FIG. 8 of the present disclosure.

Figure 8:
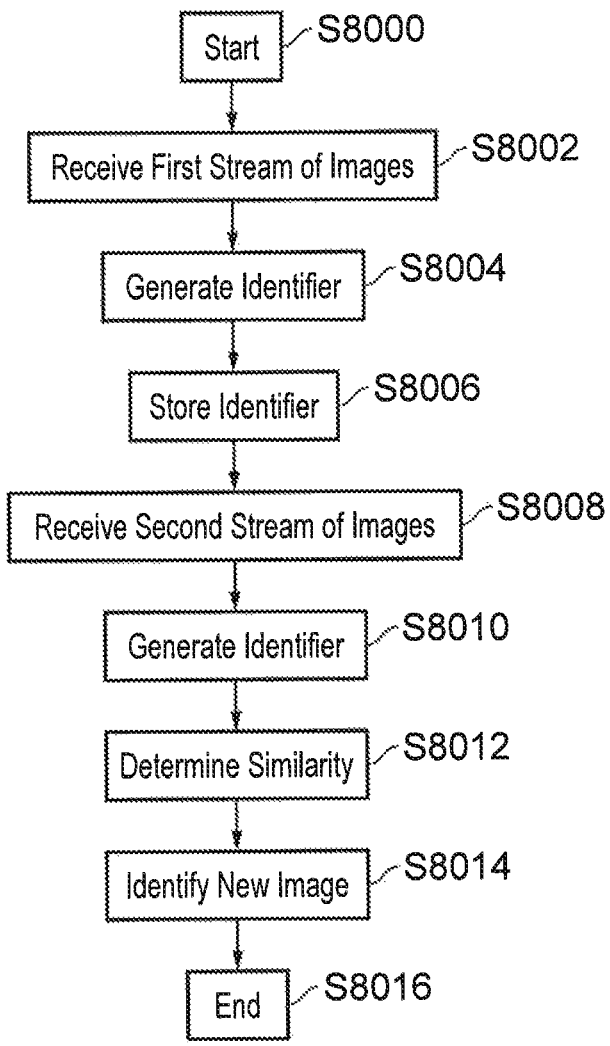
FIG. 8 illustrates a method of identifying new images of a scene in accordance with embodiments of the disclosure.

Method of Identifying New Images of a Scene:

FIG. 8 illustrates a method of identifying new images of a scene in accordance with embodiments of the disclosure. This method may be performed by an apparatus such as apparatus 1000 described with reference to FIG. 1 of the present disclosure.

The method starts in step S8000, and proceeds to step S8002.

In step S8002, the method according to embodiments of the disclosure comprises receiving a first stream of images of the scene, the first stream of images comprising images obtained from at least one camera and images obtained from at least one transmission source. In certain examples, images from the at least one camera may be images captured from a plurality of image capture devices located around a scene (such as image capture devices 2002 described with reference to FIG. 2 of the present disclosure. Alternatively or in addition, the images from the at least one transmission source may comprise images received from a broadcaster such as broadcaster 2006 described with reference to FIG. 2 of the present disclosure. However, it will be appreciated that the present disclosure is not particularly limited in this regard. Furthermore, the method of receiving the images is not particularly limited. That is, the images may be received by any wired or wireless connection as required.

Once images of the first stream of images have been received, the method proceeds to step S8004.

In step S8004, the method according to embodiments of the disclosure comprises generating at least one identifier for each image in the first stream of images, the at least one identifier being indicative of the content of the image. The method of generating the at least one identifier being indicative of the content of the image is not particularly limited. For example, the method according to embodiments of the disclosure may comprise generating the at least one identifier in accordance with the example described with reference to FIG. 3 of the present disclosure.

Once the at least one image identifier has been generated, the method proceeds to step S8006.

In step S8006, the method according to embodiments of the disclosure comprises storing the at least one identifier for each image of the first stream of images in a storage. The storage may be storage such as storage 1006 described with reference to FIG. 1 of the present disclosure, for example. However, storage may be located externally to the apparatus 1000. That is, any such storage can be used in accordance with embodiments of the disclosure, provided the at least one identifiers for each image of the first stream of image can subsequently be retrieved from the storage as required.

Once the image identifier has been stored, the method proceeds to step S8008.

In step S8008, the method according to embodiments of the disclosure comprises receiving a second stream of images of the scene obtained from the at least one transmission source. It will be appreciated that the second stream of images also comprises images of the scene. Further, in certain examples, these images are received from the at least one transmission source from which a portion of the images of the first stream of images were received. However, as described above, the method of receiving the second stream of images is not particularly limited. That is, the images may be received using any suitable wired or wireless connection. Moreover, in certain examples, the second stream of images may comprise a stream of images as described with reference to FIG. 2 of the present disclosure. However, the present disclosure is not particularly limited in this regard, and any stream of images received from the transmission source independently of the first stream of images may form the second stream of images in accordance with embodiments of the disclosure.

However, once the images from the second stream of images have been received, the method proceeds to step S8010.

In step S8010, the method according to embodiments of the disclosure comprises generating at least one identifier for each image in the second stream of images. As noted above with reference to method step S8004, the method of generating the at least one identifier for each image in the second stream of images is not particularly. However, it will be appreciated that the identifiers of the second stream of images are generated in a manner comparable to the identifiers for the first stream of images, such that a determination of the correspondence between the identifiers of the first and second stream of images can subsequently be performed. That is, it will be appreciated that the identifier for the second stream of images is likewise indicative of the content of the images in the second stream of images.

Once the image identifiers for the images of the second stream of images have been generated, the method proceeds to step S8012.

In step S8012, the method according to embodiments of the disclosure comprises determining, for each image of the second stream of images, a degree of similarity between the content of the image of the second stream and the content of the images of the first stream based on correspondence between the at least one identifier generated for the image of the second stream and the at least one identifiers in the storage. Of course, the method of determining the degree of similarity between the images, based on a correspondence of the identifiers, may vary in accordance with the type of identifier which has been generated. For example, in certain situations, the correspondence may comprise determining a numerical difference between the values of the respective identifiers. However, it will be appreciated that the present disclosure is not particularly limited in this regard. That is, any suitable method of determining the correspondence may be used in accordance with embodiments of the disclosure, provided said correspondence enables a degree of similarity between the content of the respective images to be determined.

Once the degree of similarity between the images of the first and second stream of images has been determined, the method proceeds to step S8014.

In step S8014, the method according to embodiments of the disclosure comprises identifying an image of the second stream of images as a new image of the scene in accordance with the determined degree of similarity of the image.

Once the new images of the second stream of images have been identified, the method proceeds to, and ends with, method step S8016.

According to embodiments of the disclosure, efficient and accurate identification of new images in a stream of images can be performed, enabling collation of the images from a number of different image capture devices in a substantially real time environment. Of course, it will be appreciated that the present disclosure is not particularly limited to these advantageous effects, there may be others.

Storing Images of a Scene:

As described above, in certain situations, such as when receiving images from multiple image sources, it is desirable that image information efficiently stored. As such, according to embodiments of the disclosure, a method of storing images of a scene is provided. Now, it will be appreciated that the method of storing images may be applied to any situation whereby efficient storage of a stream of images is required. That is, for example, the method according to embodiments of the disclosure may be applied to an example situation where images are captured at a sporting event such as a football (soccer) match or the like. As such, embodiments of the disclosure will be described with reference to this example situation. However, it will be appreciated that the present disclosure is not particularly limited in this regard, and may alternatively be applied to any such situation whereby storage of images of a scene is required.

Figure 9:
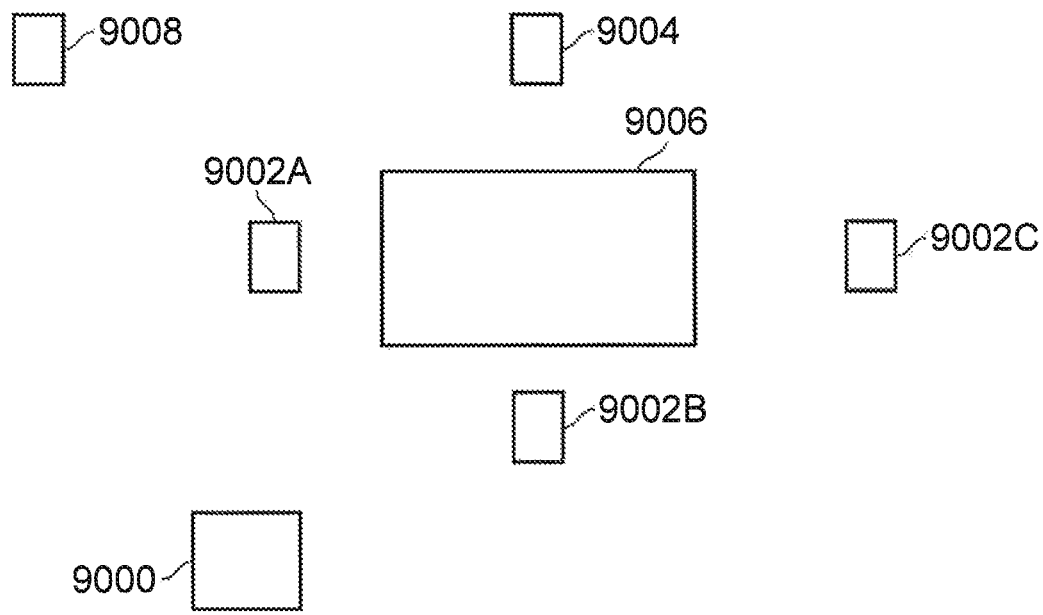
FIG. 9 illustrates an example image capture scene in accordance with embodiments of the disclosure.

FIG. 9 illustrates an example image capture scene in accordance with embodiments of the disclosure.

In the example situation shown in FIG. 9, a number of image capture device 9002A, 9002B, 9002C and 9004 are located around a scene 9006. These image capture devices are arranged such they capture an image of the scene 2000 from a certain angle, thus capturing a certain viewpoint of the scene. Now, it will be appreciated that type of image capture device may vary in accordance with embodiments of the disclosure and is not particularly limited. Furthermore, the numbers and/or locations of these image capture devices are not particularly limited to the numbers and/or locations shown in FIG. 9. Rather, any number of image capture devices may be provided at any location around the scene in accordance with the situation as required.

However, in this example, it will be appreciated that a first set of image capture devices 9002A, 9002B and 9002C is provided. This first set of image capture devices 9002A, 9002B and 9002C capture images of a scene of a first type. In contrast image capture device 9004 captures images of the scene of a second type. That is, in this example, image capture devices 9002A, 9002B and 9002C may capture images of the scene at a first frame rate (such as 50 Hz) while image capture device 9004 captures images of the scene at a second frame rate. The second frame rate may be higher or lower than the first frame rate. In a specific example, image capture device 9004 may be an ultra motion image capture device capable of capturing images at a frame rate of 400 Hz. Furthermore in certain examples such as whereby the image capture devices are located at a sporting event, each of the image capture device may be high performance image capture devices which capture a stream of high resolution, or 4K, images of the scene. However, the present disclosure is not particularly limited in this regard.

In this example, image capture devices 9002A, 9002B and 9002C are communicatively coupled to an apparatus 9000. That is, apparatus 9000 may directly receive images of the scene from image capture devices 9002A, 9002B and 9002C in substantially real time. However, the total number of cameras from which apparatus 9000 can receive a live stream of images may be limited in accordance with the bandwidth of the connection between the plurality of image capture devices and apparatus 9000.

Now, it will be appreciated that apparatus 9000 is an apparatus such as that described with reference to FIG. 1 of the present disclosure. Furthermore, in this specific example, apparatus 9000 may receives images of the scene such that apparatus 9000 can perform substantially real time analysis on the images of the scene. That is, in this specific example, apparatus 9000 may perform, or assist in preforming, analysis such as the analysis required for a Video Assistant Referee, or the like.

It will also be appreciated that in this example apparatus 9000 may directly receive images from image capture device 9004 in addition to those image received from image capture device 9002A, 9002B and 9002C. However, in this example, apparatus 9000 does not receive the images from image capture device 9004 at the ultra high frame rate (such as 400 Hz) at which those images are captured. Rather, apparatus 9000 receives a sample of the images captured by image capture device. In other words, in this example, the images captured by image capture device 9004 are transmitted to apparatus 9000 at a frame rate corresponding to the frame rate of image capture devices 9002A, 9002B and 9002C.

In fact, while in this example only the frame rate of image capture device 9004 has been reduced prior to transmission to apparatus 9000, it will be appreciated that the frame rate of any of the image capture devices present at the scene may be reduced prior to transmission to apparatus 9000 in accordance with the specific requirements of the situation.

Of course, the manner of reducing the frame rate in accordance with embodiments of the disclosure is not particularly limited. In this example however, the frame rate is reduced by transmitting only a portion of the images captured by the image capture device. For example, reducing the frame rate of an image capture device which captures images at 400 Hz to 50 Hz may comprise transmitting only 1 in 8 image frames which have been captured by the image capture device to apparatus 9000.

As such, it will be appreciated that apparatus 9000 receives a stream of images of the scene from the plurality of image capture devices. Moreover, the frame rate of the image stream received by apparatus 9000 may be less than the frame rate at which those images were captured by the plurality of image capture devices.

In the example situation shown in FIG. 9, a broadcaster 9008 is located at the scene 9006. Of course, any number of broadcasters 9008 may be present at the scene and the present disclosure is not particularly limited in this regard. In this example, broadcaster 9008 may receive image streams from all the image capture devices located around the scene. Moreover, broadcaster 9008 may receive the images from the image capture devices 9002A, 9002B, 9002C and 9004 at the frame rate at which those images were captured. For example, broadcaster 9008 may receive images from image capture device 9004 at 400 Hz.

Accordingly, it will be appreciated that broadcaster 9008 may receive image streams from the image capture devices located at the scene 9006 at a frame rate which is unavailable to apparatus 9000.

Now, in this example, broadcaster 9008 is an entity which receives images from the scene and provides those images to consumers. That is, in this example, broadcaster 9008 provides images of the sporting event which have been captured by the image capture device 9002A, 9002B, 9002C and 9004 such that the sporting event can be watched by consumers. In other words, the broadcaster 9008 transmits a program comprising an image feed obtained from the image capture devices in substantially real time, such that the consumers can watch the sporting event on consumer devices, such a television. It will be appreciated that the manner in which broadcaster 9008 transmits the images to consumers is not particularly limited in accordance with embodiments of the disclosure, and may comprise digital broadcasting, satellite transmission, cable transmission or transmission over the internet, for example.

Of course, while broadcaster 9008 receives images from the plurality of image capture devices which are present at the scene 9006, the broadcaster 9008 typically transmits an image from a single image capture device to the consumer at any given instant in time. The broadcaster 9008 may dynamically select the image capture device from which to transmit images to the consumer in accordance with the action which is occurring in the sporting event. The present disclosure is not particularly limited in this regard, and the choice of image capture device may vary in accordance with the situation.

Furthermore, typically the broadcaster 9008 may reduce transmit the images of the scene to a predetermined frame rate, such as 50 Hz. However, when certain events occur during the sporting event, the broadcaster 9008 may determine to broadcast images at a different frame rate in order to provide slow motion style images to the consumer. That is, for example, the broadcaster 9008 may determine to transmit images from an ultra motion image capture device such as image capture device 9004 at the frame rate at which they were captured. In this example, broadcaster 9008 may determine to transmit images to the consumer in this manner during a slow motion action replay of the scene.

Now, since broadcaster 9008 is transmitting the images to the consumer in substantially real time, it will be appreciated that communication circuitry of apparatus 9000 can receive the images from the broadcaster 9008 in addition to the images received directly from the image capture devices. In other words, apparatus 9000 may receive images of the scene from two distinct sources; either from the image capture devices located at the scene or from transmission by the broadcaster 9008.

As such, at certain instances of time, the apparatus 9000 may receive images of the same content at two distinct frame rates. That is, apparatus 9000 may receive images from image capture device 9004 at a first frame rate (such as 50 Hz) and images transmitted from the broadcaster 9008 from image capture device 9004 at a second frame rate (such as 400 Hz). Importantly, slow motion images, transmitted at the higher frame rate, by the broadcaster 9008, may provide visual information regarding an event which has occurred in the scene which is not available to apparatus 9000 directly from the image capture devices (transmitted at the lower frame rate).

However, the images between these two distinct image streams will not be synchronised in this situation. Accordingly, it can be difficult to perform accurate analysis of the images of the scene. As such, it is desired that apparatus 9000 stores the images received from the two feeds in an efficient manner, such that analysis on the two streams of images can be performed.

Example Image Storage

Figure 10:
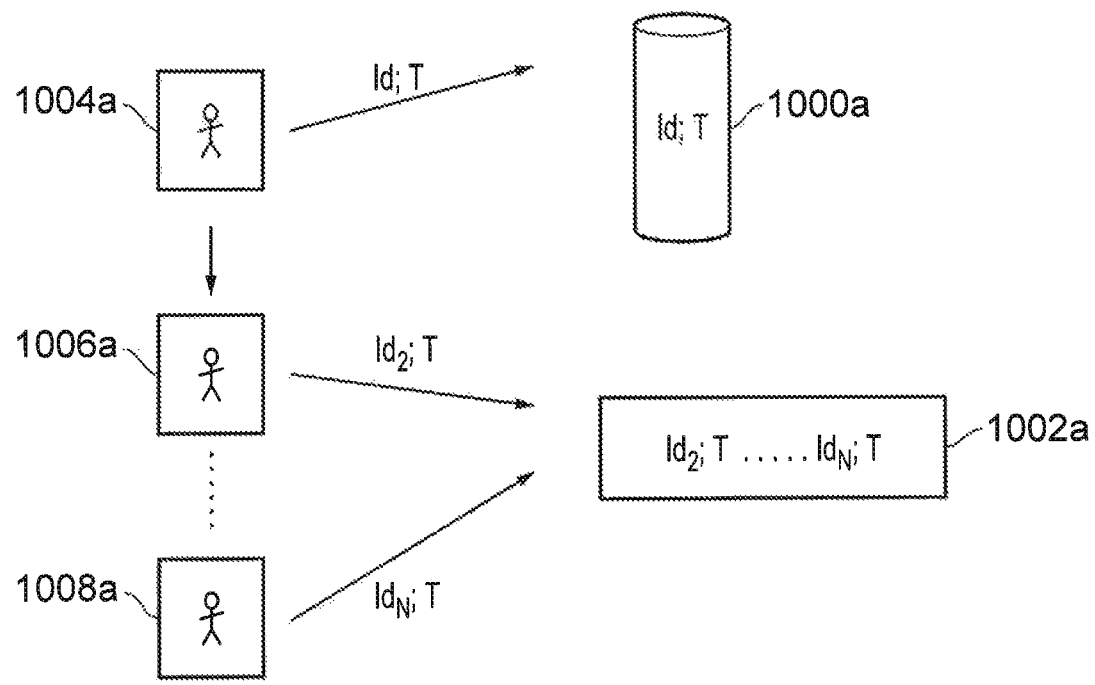
FIG. 10 illustrates an example of storing images in accordance with embodiments of the disclosure.

FIG. 10 illustrates an example of storing images in accordance with embodiments of the disclosure.

In this example, a first image 1004a received by apparatus 9000 is shown. Image 1004a may have been received by apparatus 9000 from any of image capture devices 9002A, 9002B, 9002C or 9004 described with reference to FIG. 9 of the present disclosure. Alternatively, image 1004a may have been received by apparatus 9000 from a transmission of the broadcaster 9008. The source of the image may be determined by apparatus 9000 in accordance with certain information or metadata transmitted with the image content in certain example situations. However, the present disclosure is not particularly limited in this regard.

Now, when apparatus 9000 receives an image, apparatus 9000 is configured to generate at least one image identifier of the image, the image identifier being indicative of the content of the image.

That is, for each image which is received, apparatus 9000 computes at least one image identifier which is indicative of the content of the image. In certain examples, the image identifier may be determined based on a property of the image content of the image, such that it can be used to represent the content of that image. In other words, the at least one image identifier provides an efficient numerical representation of every image which is received by apparatus 9000. The hash function may be executed by performing a discrete cosine transform of the image, for example. Moreover, in certain examples, a 64 bit hash function can be performed on the image content.

In certain examples, a perceptual hash may be generated such that images with the same, or similar, image content will have the same, or similar, hash values (or image identifiers). In other examples, a non-perceptual hash may be generated. A non-perceptual hash could comprise an N bit representation of the image content, whereby similar images do not have similar hash values. A non-perceptual hash function may be performed in any suitable manner such as using traditional hash functions MD5 and/or SHA for example. Use of non-perceptual hash values may be particularly advantageous when a large number of images with similar image content are present, such as when receiving images at a high frame rate from an ultra motion image capture device such as image capture device 9004, for example.

In other words, in certain example situations both a perceptual hash and a non-perceptual hash may be generated for an image. The perceptual hash may be used to provide a coarse indication of whether two images are similar, while the non-perceptual hash may be used to distinguish between similar images. That is, use of both a perceptual hash and a non-perceptual hash may improve the accuracy of the storage of the images of the scene in accordance with embodiments of the disclosure.

In fact, a number of distinct image identifiers for a given image may be generated, each image identifier indicative of a certain portion of the content of the image. However, it will be appreciated that the present disclosure is not particularly limited in this regard, and any suitable function which produces an identifier which can be used to analyse the content of the image can be used in accordance with embodiments of the disclosure.

Furthermore, it will be appreciated that the at least one identifier for the image may be generated in the manner described with reference to FIG. 3 of the present disclosure. That is, in certain examples the at least one image identifier may be generated for the entire image. However, in other examples, the at least one image identifier may be generated for a selected sub-region of the image. Furthermore, the at least one image identifier may be generated on a sub-sampled version of the image. Generating the at least one image identifiers in this manner may reduce the processing load thus further improving the speed and efficiency of the processing performed by apparatus 9000.

Once the at least one image identifier has been generated for the image, apparatus 9000 may be configured to store the at least one image identifier of the image in association with temporal information for that image in a first storage 1000a.

It will be appreciated that the form of the first storage 1000a is itself not particularly limited. That is, first storage 1000a may be internal to apparatus 9000. Alternatively, the first storage 1000a may be located externally to apparatus 9000. That is, the form of storage 1000a is not particularly limited provided apparatus 9000 can store, and subsequently retrieve, images from the storage 1000a. In certain examples, the first storage 1000a may comprise at least a portion of the storage medium 1006 of apparatus 1000 described with reference to FIG. 1 of the present disclosure.

Furthermore, the information which apparatus 9000 stores in the first storage is not particularly limited, insofar that apparatus 9000 stores the at least one image identifier of the image which has been generated in association with temporal information for that image in the first storage 1000a.

Alternatively or in addition, in certain examples the first storage may be specific to the image capture device from which that content is received. That is, for each of the image capture devices 9002A, 9002B, 9002C, and 9004, apparatus 9000 may construct or utilize a different respective first storage means 1000a. The present disclosure is not particularly limited in this respect.

Alternatively or in addition, in certain examples, the apparatus 9000 may be configured to directly store the image content of image 1004a. This may be stored in the first storage 1000a alongside the image identifier and the temporal information. However, the present disclosure is not particularly limited in this respect.

In other words, according to embodiments of the disclosure, for each image which is received, apparatus 9000 generates and stores the at least one image identifier in association with temporal information for that image.

As noted above, the temporal information may be received with the image content. That is, the additional information or metadata defining the temporal information may be received with each image as that image is received by apparatus 9000. Alternatively, the temporal information may be received subsequently to the image content. Alternatively, apparatus 9000 may generate the temporal information for each image which is received in accordance with certain features of the image. That is, the present disclosure is not particularly limited in the manner that apparatus 9000 obtains the temporal information.

Furthermore, the form and content of the temporal information is not particularly limited. In certain examples, the temporal information may comprise a timestamp indicative of the time of capture of the image. In other examples, the temporal information may be representative of the time of receipt of the content, or the time of transmission. The temporal information may be an absolute time, or may be computed relative to a certain indication, such as transmission of the first image in a set of images, for example.

Returning now to FIG. 10, once apparatus 9000 has stored the information in the first storage, apparatus 9000 may be configured to determine a degree of similarity between the content of the image 1004a and previous images which have been received based on a correspondence between the at least one image identifier of the image 1004a and the at least one images identifiers of the previous images in the first storage 1000a.

It will be appreciated that in many situations it is desired that apparatus 9000 determines the degree of similarity between the content of the image which has been received and the images in storage 1000a in a substantially real time environment. In certain examples, the correspondence between the at least one identifier generated for the image of the second stream and the image identifiers of the first stream in the storage may be determined based upon a calculation of the Hamming distance between the respective identifiers. In this case, the Hamming distance indicates the number of differing bits between the two image identifiers. The smaller the Hamming distance, the greater the level of similarity between the two images. The level of tolerance around the Hamming distance (that is, the required level of similarity) between the image identifier of the two images should be set in accordance with the specific situation to which the embodiments of the disclosure are applied.

In certain embodiments, an image may only be considered to be correlated with an image in the first storage when both the perceptual and non-perceptual hash image identifiers match. However, the present disclosure is not particularly limited to this specific situation.

As such, in certain examples, the received image may be determined as corresponding to an image in storage 1000a when the Hamming distance between the respective image identifiers is below a certain threshold. However, the claimed invention is not particularly limited in this regard.

In other words, for every image which is received and stored in the first store 1000a, such as image 1004a, the apparatus 9000 according to embodiments of the disclosure is configured to search the store 1000a for any images already in the first store having a degree of similarity with the image which has been received over a certain threshold. These images will have temporal information anterior to the temporal information of the image. When an image is found, it can be determined that the image corresponds to an image which was previously received (that is, a match with the first image is found). In the example of FIG. 9, this may be the case when a slow motion replay of an event is being transmitted by the broadcaster 9008.

Consider the example described with reference to FIG. 9 of the disclosure. Apparatus 9000 and broadcaster 9008 capture images from the same plurality of image capture devices. However, in certain situations, such as when broadcaster 9008 transmits a slow motion replay of an event, only a certain number of the images transmitted by the broadcaster 9008 will correspond to the images which have been previously received by the apparatus 9000. In the example whereby the broadcaster 9008 transmits the slow motion replay at 400 Hz, while the apparatus 9000 receives images directly from the image capture devices at a frame rate of 50 Hz, only 1 in 8 images received from the broadcaster 9008 will correspond to images previously received directly from the plurality of image capture devices. As such, when a match has been identified, the apparatus 9000 can determine that a certain number of subsequent images will correspond to images with temporal information located between a first and second image stored in the first store 1000a which have been received directly from the image capture devices.

In other words, in the example of a high frame rate replay, it is desired that apparatus 9000 detects the high frame rate replay has been initiated and stores the replay footage in a second storage portion of the store such that synchronisation with the images received directly from the image capture devices can be achieved.

Accordingly, once an image 1004a has been determined to correlate (or match) with an image in the store 1000a, the apparatus 9000 is configured to store the at least one image identifier of subsequently received images in a second storage in association with temporal information corresponding to a first previous image. That is, when the determined degree of similarity between the image 1004a and the first previous image exceeds a predetermined threshold.

As shown in FIG. 10, once image 1004a has been determined to match an image already held in the first storage 1000a, the image identifiers of subsequent images 1006a and 1008a are stored in a second storage 1002a rather than being placed directly in the first store. That is, since these images correspond to a higher frame rate version of the images already held in the store 1000a, they should not be stored at the time at which they have been received in the first storage, as doing so would damage the synchronicity of the first storage. Rather, these images should be inserted at an appropriate point in the first store 1000a to achieve synchronisation. In order to achieve this, apparatus 9000 first records the subsequently received images 1006a, 1008a in the second store 1002a.

Now it will be appreciated that the form of the second store 1002a is not particularly limited. In certain examples, the second store may comprise a temporary storage means, such as a buffer, for holding the images 1006a, 1008a while verification that these images consist of a higher frame rate version of the images in the store can be achieved. The second store 1002a may be external or internal to the apparatus 9000. In certain examples, the second storage 1000a may comprise at least a portion of the storage medium 1006 of apparatus 1000 described with reference to FIG. 1 of the present disclosure.

It will further be appreciated that, in examples, the subsequent images 1006*a* and 1008*a* are stored in the second store in association with temporal information corresponding to the image in the first store with which a match with image 1004*a* was found. That is, in certain examples, subsequent images 1006*a* and 1008*a* are not stored in the second store 1002*a* in association with the temporal information with which they were received. Rather, they are stored in the second storage in association with temporal information indicative of their relative location in the first storage 1000*a*.

In other words, according to embodiments of the disclosure all subsequent frames which are received (such as images 1006*a*, 1008*a*) are pushed into the second storage 1002*a* in order to maintain the integrity and synchronicity of the images in the first store 1000*a*.

Now it will be appreciated that the actions performed by apparatus 9000 once the two stores have been constructed are not particularly limited and will vary in accordance with the situation.

In certain examples, it may be desirable that images which have been temporarily stored in the second store 1002*a* are inserted into the first store 1000*a* at an appropriate point. This may be desired whereby the uniformity of the frame rate of the images in the first store need not be maintained.

Alternatively, it may be desirable that images in the second store are maintained permanently in the second store 1002*a*, such that images at a first frame rate are held in the first store, while images of a second frame rate are held in the second store. Alternatively, it may be desired that only the images in the first store are maintained.

However, it will be appreciated that in any of these situations, synchronisation of storage for the images which have been received by apparatus 9000 can be maintained.

Figure 11:
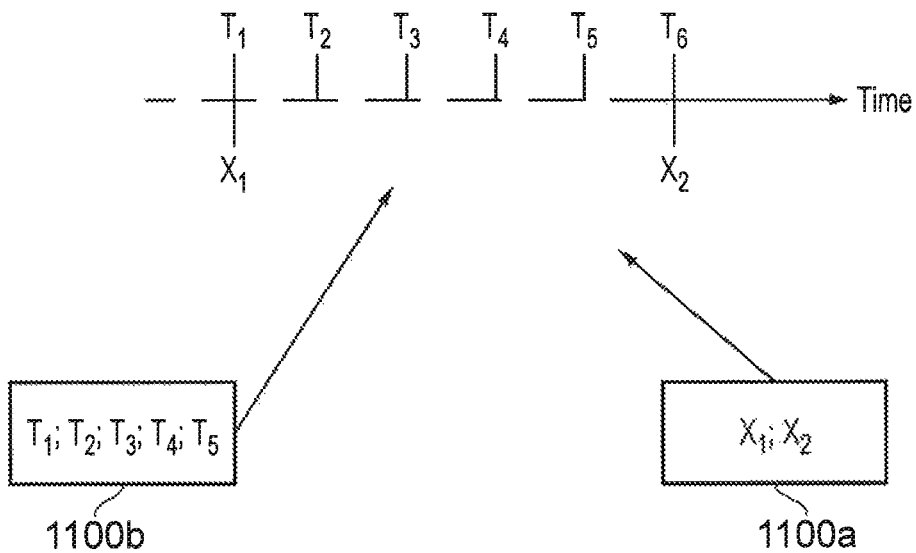
FIG. 11 illustrates an example of storing images in accordance with embodiments of the disclosure.

Insertion into the First Storage:

FIG. 11 illustrates an example of storing images in accordance with embodiments of the disclosure. In this example, images X1 and X2 were originally received by the apparatus 9000. These images correspond to images which were received by apparatus 9000 directly from an image capture device during a live stream. In this specific example, these images were obtained at a first frame rate, such as 50 Hz. Furthermore, these images were originally stored directly in the first store 1100*a*.

Images T1 to T6 correspond to images which were received by apparatus 9000 at a frame rate different from the frame rate at which images X1 and X2 were received. These may be images received during a high frame rate replay of an event transmitted by broadcaster 9008 for example. As described with reference to FIG. 10, these images were originally identified as corresponding to a replay of the event because a match was found for at least one of the images with an image already stored in the first storage 1100*a* at an earlier time. Accordingly, images T1 to T6 were initially stored in the second store 1100*b*.

In other words, in this specific example, the content of image T1 was identified, from the determined degree of similarity, as corresponding to the content of image X1 which had been received at a time anterior to T1. Accordingly, image T1, and subsequent images T2 to T6, were not stored in the first store 1100*a*. Rather, these images were stored in the second store 1100*b*.

Accordingly, since the replay of the event has been detected in this manner, synchronisation of the first storage can be maintained.

Of course, it will be appreciated that while the example illustrated in FIG. 11 is limited to a specific number of images, the present disclosure is not particularly limited in this regard. That is, any number of images or image streams may be received by apparatus 9000 depending on the specific situation to which the embodiments of the disclosure are applied.

However, as described above, in certain situations images T1 to T6 may comprise important information regarding an event which has occurred. Moreover, their appropriate insertion into the first store may be desired, such that a single synchronised store of the images can be maintained.

As such, according to embodiments of the disclosure, apparatus 9000 may be configured to determine the degree of similarity between the subsequently received images in the second storage and the previous images which have been received in the first storage based on a correspondence between the at least one image identifier of the subsequently received images and the at least one image identifiers of the previous images. Furthermore, apparatus 9000 may be configured to transfer the subsequently received images stored in the second storage to the first storage, in association with the temporal information of the first previous image, when the determined degree of similarity between the at least one subsequently received images and a second previous image exceeds a predetermined threshold.

Consider the situation in FIG. 11, for example. Once a correlation or match has been identified between image T1 and X1, all subsequently received images (T2 to T5) are stored in the second storage 1100*b*. However, when storing each subsequently received image in the second storage 1100*b*, the apparatus 9000 will continue to generate the image identifiers for these images and will determine a degree of similarity between these images (T2 to T5) with the images already held in the first store 1100*a*. When a second match is found between a subsequently received image T6 and a second image held in the first store 1100*a*, it can be determined that the subsequently received images T1 to T6 held in the second store comprise high frame rate versions of the images X1 and X2, with images T2 to T5 corresponding to high frame rate images between image X1 and image X2.

In other words, when a first match is found, such as T1 and X1, all subsequent images are pushed into a second memory until a second match, T2 and X2, is found. When the second match is found, the images held in the second memory, T1 to T5, can be transferred into the first memory 1100*a* and inserted into the image stream between image X1 and X2.

In this manner, the high frame rate image stream, T1 to T6, can be accurately and efficiently synchronised with the original image stream, X1 and X2.

It will be appreciated that the method of inserting the high frame rate stream T1 to T6 in the original image stream X1 and X2 is not particularly limited and will vary in accordance with the situation to which the embodiments of the disclosure are applied. For example, in certain example situations, images T2 to T5 may be uniformly distributed between the identified images pairs (namely T1 and X1, and T6 and X2 in this specific example). Alternatively, the distribution of images T2 to T5 in the image stream may be performed in accordance with the temporal information received for those images.

Now, while it will be appreciated that images T1 and T6 do not provide apparatus 9000 with additional information regarding the scene, subsequent images T2 to T5 which correspond to high frame rate images located between original images X1 and X2 provide apparatus 9000 with additional high frame rate views of the scene. Moreover, by combining these image streams in a single resultant synchronised image stream, subsequent analysis of the resultant synchronised image stream can be performed more efficiently. In certain example situations, this subsequent analysis may be performed by apparatus 9000. However, the present disclosure is not particularly limited in this respect.

In addition, in certain examples, apparatus 9000 may be configured to determine the temporal information of the first image with which a match was found (X1, in this example situation) and the temporal information of the second image with which a match was found (X2, in this example situation). This temporal information may be determined from the first store 1100*a*, since apparatus 9000 will have stored that information in association with the first image and second image when those images were received. Furthermore, this temporal information can be used in order to validate the identification and synchronisation of the images. That is, in certain examples, apparatus 9000 can perform a check that the temporal information of the first image with which a match was found is anterior to the temporal information of the second image with which a match was found. In certain situations, only if this is the case will the images in the second store 1100*b* be transferred to the first store 1100*a*.

That is, if a genuine slow motion replay has been identified for example, then a match with a second image located later in the image stream than the first image will be found.

In other words, only if the temporal information of the second image with which a match is found is appropriate in comparison to the temporal information of the first image with which a match is found will the images in the second store be transferred and inserted into the first image stream. This verification can reduce spurious identification of images and further increases the accuracy and efficiency of the storage of images of the scene in accordance with embodiments of the disclosure.

Alternatively or in addition, apparatus 9000 may restrict the number of images which can be stored in the second storage 1100*b*. That is, according to embodiments of the disclosure apparatus 9000 may be configured to determine the number of images in the second store, and when number of subsequently received images in the second storage exceeds a predetermined threshold before the determined degree of similarity with the second previous image is achieved, apparatus 9000 may remove the subsequently received images from the second storage.

Consider the example situation described with reference to FIG. 9 of the present disclosure. In this specific example, the maximum frame rate of images which will be received during a high frame rate transmission, such as a slow motion replay, from broadcaster 9008 may be determined in advance. That is, in this specific example, apparatus 9000 may know in advance that the maximum frame rate which will be received from the broadcaster 9008 is 400 Hz owing to the limitations of the image capture devices present at the scene. Moreover, in this specific example, apparatus 9000 may know that the original stream of images received directly from the image capture devices had a frame rate of 50 Hz. Accordingly, during any high frame rate replay from the broadcaster 9008, apparatus 9000 will recognise a minimum of 1 in 8 images transmitted by the broadcaster 9008.

Accordingly, if the number of images in the second store (that is, the number of unrecognised images received after the first image has been recognised) exceeds this expected number, apparatus 9000 can be configured to determine that the high frame rate replay from the broadcaster 9008 has stopped and that no second match will be found with the originally received images. In this case, in certain examples, the remaining images in the second memory may be discarded. However, it will be appreciated that the present disclosure is not particularly limited in this regard.

Configuring the upper limit of the number of images which may be held in the second store in this manner further improve the efficiency of storing images of the scene in accordance with embodiments of the disclosure, because the end of high frame rate replays of the scene can be identified.

Of course, it will be appreciated that while embodiments of the disclosure have been described with reference to the example situation of a sporting event illustrated in FIG. 2, the present disclosure is not particularly limited in this regard. That is, embodiments of the disclosure may be applied to any situation whereby efficient storage of a stream of images is required. For example, embodiments of the disclosure could be applied to images from a number of different image capture systems including images received from closed circuit television (CCTV) camera systems or the like.

As such, it will be appreciated that a method of identifying new images of a scene is provided in accordance with embodiments of the disclosure, as described with reference to FIG. 12 of the present disclosure.

Figure 12:
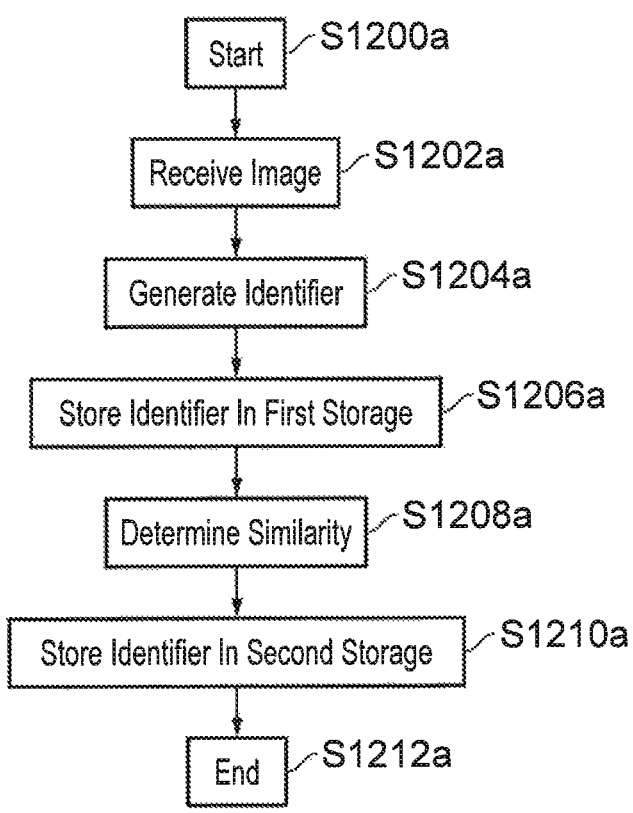
FIG. 12 illustrates a method of storing images in accordance with embodiments of the disclosure.

Method of Storing Images of a Scene:

FIG. 12 illustrates a method of storing images of a scene in accordance with embodiments of the disclosure. This method may be performed by an apparatus such as apparatus 1000 described with reference to FIG. 1 of the present disclosure.

The method starts at step S1200*a*, and proceeds to step S1202*a*.

In step S1202*a*, the method comprises receiving an image of a scene. The method of receiving the image of the scene is not particularly limited in accordance with embodiments of the disclosure. For example, any wired or wireless connection can be used to receive the image as required. Alternatively, the image may be received through use of communication circuitry 1004 described with reference to FIG. 1 of the present disclosure. Furthermore, it will be appreciated that the type of image which can be received in accordance with embodiments of the disclosure is also not particularly limited. In certain situations, the image may be a high resolution image of a scene, for example.

However, once the image has been received, the method proceeds to step S1204*a*.

In step S1204*a*, the method comprises generating at least one image identifier of the image, the at least one image identifier being indicative of the content of the image. The number of image identifiers generated in step S1204*a* may vary in accordance with the situation. That is, one, two or more identifiers indicative of the content of the image may be generated as required. The method of generating the identifiers is not particularly limited, insofar as the identifiers which have been generated are indicative of the content of the image which has been received in step S1202*a*.

Once the at least one image identifier has been generated, the method proceeds to step S1206*a*.

In step S1206*a*, the method comprises storing the at least one image identifier of the image in association with temporal information for that image in a first storage. In certain situations, the temporal information may comprise a timestamp of the image which has been received. However, the present disclosure is not particularly limited in this respect. Moreover, any method may be used to receive, generate or obtain the temporal information of the image for storage in the first storage in accordance with the situation.

Once the at least one image identifier has been stored, the method proceeds to step S1208a.

In step S1208a, the method comprises determining a degree of similarity between the content of the image and previous images which have been received based on a correspondence between the at least one image identifier of the image and the at least one images identifiers of the previous images in the first storage. The method of determining the degree of similarity will of course vary in accordance with the number and type of image identifier which have been generated in step S1204a. In certain situations, the determined degree of similarity may be based on a numerical comparison of the identifiers of the images which have been generated, for example.

Once the degree of similarity has been determined, the method proceeds to step S1210a.

In step S1210a, the method comprises storing the at least one image identifier of subsequently received images in a second storage in association with temporal information corresponding to a first previous image when the determined degree of similarity between the image and the first previous image exceeds a predetermined threshold.

The method proceeds to, and ends with, step S1212a.

Accordingly, efficient storage and synchronisation of the images of the scene can be obtained.

Figure 13:
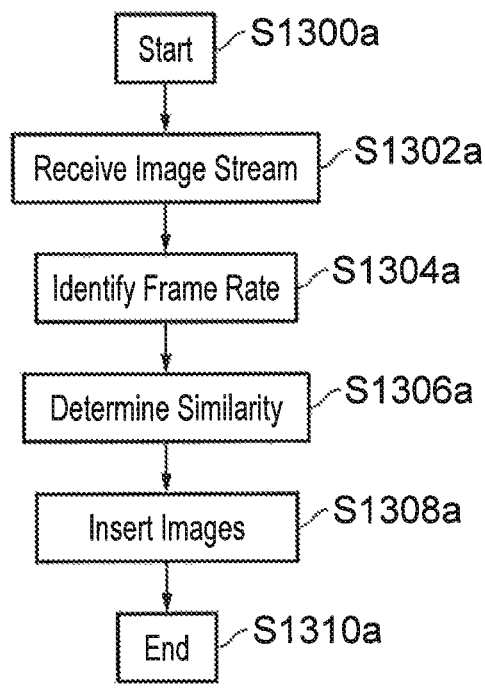
FIG. 13 illustrates a method of image processing in accordance with embodiments of the disclosure.

Method of Image Processing:

The method according to embodiments of the disclosure may more generally be applied to the synchronisation of a first and second image stream. Hence more generally, a method of image processing is provided. FIG. 13 illustrates a method of image processing in accordance with embodiments of the disclosure. This method may be performed by an apparatus such as apparatus 1000 described with reference to FIG. 1 of the present disclosure.

The method starts and step S1300a, and proceeds to step S1302a.

In step S1302a, the method comprises receiving a second image stream. Now, it will be appreciated that the method of receiving the second image stream is not particularly limited in accordance with embodiments of the disclosure. For example, the second image stream could be received directly from a plurality of image capture devices. Alternatively, the second image stream could be indirectly received from the plurality of image capture devices through reception of a transmission of a broadcaster as described with reference to FIG. 9 of the present disclosure. Alternatively, the second image stream may be received from a storage device or memory, such as storage medium 1006 described with reference to FIG. 1 of the present disclosure.

Furthermore, it will be appreciated that the form of the second image stream is not particularly limited. The images of the second image stream may comprise a number of images consecutively captured by any form of image capture device. Specifically, a high resolution or 4K image capture device may be used in certain situations. Furthermore, in certain examples, the stream of images may form a video of a scene. However, the number of images in the second stream of images is not particularly limited.

Once the second stream of images has been received, the method proceeds to step S1304a.

In step S1304a, the method according to embodiments of the disclosure comprises identifying the second image stream has a frame rate above a predetermined threshold. That is, for example, the method according to embodiments of the disclosure comprises identifying that the temporal relationship between the images in the second image stream exceeds a predetermined threshold. The frame rate may be determined from the time of capture of the images of the second image stream, for example. However, the present disclosure is not particularly limited in this respect. In fact, any such method of determining the frame rate may be used as required. For example, additional information indicative of the frame rate may be obtained or received as required.

Of course, it will be appreciated that the value of the predetermined threshold may vary in accordance with the situation to which embodiments of the disclosure are applied. In certain examples, the predetermined threshold may be an absolute threshold. However, in other examples, the predetermined threshold may be a relative threshold set in accordance with the frame rate of a first image stream. Any such predetermined threshold may be used as required.

Once it has been identified that the second image stream exceeds the predetermined threshold, the method proceeds to step S1306a.

In step S1306a, the method comprises determining a degree of similarity between the images of the second stream and images of a previously received first image stream. That is, a degree of similarity between the content of the images of the second stream of images and the content of the images of a first image stream is determined. Now, it will be appreciated that the form of the first image stream, and its manner of reception, are not particularly limited and may vary as described for the second image stream with reference to method step S1302a of the present disclosure. Moreover, the timing of the reception of the first image stream is not limited provided that the first image stream has been received prior to the determination of the degree of similarity. That is, the first image stream may be received prior to the reception of the second image stream. Alternatively, the first image stream may be received after the reception of the second image stream, but before the determination of the degree of similarity. In certain examples, the first image stream may be stored in a temporary storage or the like after its reception, for subsequent use in the determination of the similarity with the second stream of images.

The degree of similarity may be performed based upon a correspondence of each image in the second image stream with each image in the first image stream, for example. Alternatively, the degree of similarity may be based upon a direct comparison between the images of the respective image streams. Alternatively, the degree of similarity may be determined based upon a correspondence between at least one identifier indicative of the content of the image. In fact, any method of determining the degree of similarity may be used in accordance with embodiments of the disclosure, insofar as a level of resemblance, correspondence or similarity between the image content of the respective images can be obtained.

Once the degree of similarity has been determined, the method proceeds to step S1308a.

In step S1308a, the method comprises inserting at least one image of the second image stream into a respective portion of the first image stream in accordance with the determined degree of similarity between the images. In certain examples, the respective portion of the first image stream may be determined in accordance with temporal information provided with either the first or second image stream. Alternatively, the respective portion or location in the first image stream where the images of the second image stream should be inserted may be determined based solely upon the determined degree of similarity between the images of the first and second image stream. The present disclosure is not particularly limited in this regard.

Of course, the method of inserting the images of the second image stream into the first image stream may vary in accordance with the situation. That is, any such method may be used insofar as portions of the first image stream and second image stream are combined in accordance with the determined degree of similarity. For example, in certain situations, a resultant image stream comprising images from the first and second image stream positioned in their respective locations may be produced. Additionally, in certain examples, this resultant image stream may be placed, held or otherwise stored in a storage. However, the method according to embodiments of the disclosure is not particularly limited in this respect.

Furthermore, insertion of the images in accordance with the determined degree of similarity may comprise performing a comparison of the determined degree of similarity with a threshold limit. That is, in certain examples, only the images of the second image stream with a degree of similarity with images from the first image stream above a predetermined threshold value may be inserted into the first image stream. However, the present disclosure is not particularly limited in this respect. For example, the determined degree of similarity may be a relative value set based upon the similarity between the first and second image stream as whole. In fact, any such method for inserting the images in accordance with the determined degree of similarity can be used as required in accordance with the situation.

The method then proceeds to, and ends with, S1310a.

In this manner, efficient synchronisation between the images of the first and second image streams can be achieved.

Clauses:

In addition, further aspects of the disclosure are defined by the following numbered independent and dependent Clauses.

1. A method of storing images of a scene, the method comprising:
receiving an image of a scene;
generating at least one image identifier of the image, the at least one image identifier being indicative of the content of the image;
storing the at least one image identifier of the image in association with temporal information for that image in a first storage;
determining a degree of similarity between the content of the image and previous images which have been received based on a correspondence between the at least one image identifier of the image and the at least one images identifiers of the previous images in the first storage;
and storing the at least one image identifier of subsequently received images in a second storage in association with temporal information corresponding to a first previous image when the determined degree of similarity between the image and the first previous image exceeds a predetermined threshold.

2. The method according to Clause 1, wherein generating the at least one image identifier for an image comprising generating a hash of that image.

3. The method according to Clause 1, wherein generating the at least one image identifier comprises selecting a portion of the image and generating a hash of the selected portion of the image.

4. The method according to Clause 1, wherein generating the at least one image identifier comprises subsampling the image and generating a hash of the subsampled image.

5. The method according of any of Clauses 2 to 4, wherein the method comprises generating a perceptual hash of the image and generating a non-perceptual hash of the image.

6. The method according to any preceding Clause, wherein the temporal information for an image is a timestamp.

7. The method according to any preceding Clause, comprising:
determining the degree of similarity between the subsequently received images in the second storage and the previous images which have been received in the first storage based on a correspondence between the at least one image identifier of the subsequently received images and the at least one image identifiers of the previous images;
and transferring the subsequently received images stored in the second storage to the first storage, in association with the temporal information of the first previous image, when the determined degree of similarity between the at least one subsequently received images and a second previous image exceeds a predetermined threshold.

8. The method according to Clause 7, wherein the method comprises transferring the subsequently received images stored in the second storage to the first storage when the temporal information of the first previous image is anterior to the temporal information of the second previous image.

9. The method according to Clause 7, wherein when the number of subsequently received images in the second storage exceeds a predetermined threshold before the determined degree of similarity with the second previous image is achieved, the method comprises removing the subsequently received images from the second storage.

10. An apparatus for storing images of a scene, the apparatus comprising circuitry configured to:
receive an image of a scene;
generate at least one image identifier of the image, the at least one image identifier being indicative of the content of the image;
store the at least one image identifier of the image in association with temporal information for that image in a first storage;
determine a degree of similarity between the content of the image and previous images which have been received based on a correspondence between the at least one image identifier of the image and the at least one images identifiers of the previous images in the first storage;
and store the at least one image identifier of subsequently received images in a second storage in association with temporal information corresponding to a first previous image when the determined degree of similarity between the image and the first previous image exceeds a predetermined threshold.

11. A computer program product comprising instructions which, when the program is executed by the computer, cause the computer to carry out a method of storing images of a scene, the method comprising:
receiving an image of a scene;
generating at least one image identifier of the image, the at least one image identifier being indicative of the content of the image;
storing the at least one image identifier of the image in association with temporal information for that image in a first storage;
determining a degree of similarity between the content of the image and previous images which have been received based on a correspondence between the at least one image identifier of the image and the at least one images identifiers of the previous images in the first storage;

and storing the at least one image identifier of subsequently received images in a second storage in association with temporal information corresponding to a first previous image when the determined degree of similarity between the image and the first previous image exceeds a predetermined threshold.

12. A method of image processing, the method comprising:

receiving a second image stream;

identifying the second image stream has a frame rate above a predetermined threshold;

determining a degree of similarity between the images of the second image stream and images of a previously received first image stream; and inserting at least one image of the second image stream into a respective portion of the first image stream in accordance with the determined degree of similarity between the images.

13. An apparatus for image processing, the apparatus comprising circuitry configured to:

receive a second image stream;

identify the second image stream has a frame rate above a predetermined threshold;

determine a degree of similarity between the images of the second image stream and images of a previously received first image stream; and insert at least one image of the second image stream into a respective portion of the first image stream in accordance with the determined degree of similarity between the images.

14. A computer program product comprising instructions which, when the program is executed by the computer, cause the computer to carry out a method of image processing, the method comprising:

receiving a second image stream;

identifying the second image stream has a frame rate above a predetermined threshold;

determining a degree of similarity between the images of the second image stream and images of a previously received first image stream; and inserting at least one image of the second image stream into a respective portion of the first image stream in accordance with the determined degree of similarity between the images.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method of storing images of a scene, the method comprising:

receiving an image of a scene;

generating at least one image identifier of the image, the at least one image identifier being indicative of content of the image;

storing the at least one image identifier of the image in association with temporal information for that image in a first storage;

determining a degree of similarity between the content of the image and previous images which have been received based on a correspondence between the at least one image identifier of the image and the at least one images identifiers of the previous images in the first storage;

storing the at least one image identifier of subsequently received images in a second storage in association with temporal information corresponding to a first previous image when the determined degree of similarity between the image and the first previous image exceeds a predetermined threshold;

determining the degree of similarity between the subsequently received images in the second storage and the previous images which have been received in the first storage based on a correspondence between the at least one image identifier of the subsequently received images and the at least one image identifiers of the previous images; and transferring the subsequently received images stored in the second storage to the first storage, in association with the temporal information of the first previous image, when the determined degree of similarity between the at least one subsequently received images and a second previous image exceeds a predetermined threshold.

2. The method according to claim 1, wherein the generating of the at least one image identifier of the image comprises generating a hash of that image.

3. The method according to claim 1, wherein the generating of the at least one image identifier of the image comprises selecting a portion of the image and generating a hash of the selected portion of the image.

4. The method according to claim 1, wherein the generating of the at least one image identifier of the image comprises subsampling the image and generating a hash of the subsampled image.

5. The method according to claim 2, further comprising generating a perceptual hash of the image and generating a non-perceptual hash of the image.

6. The method according to claim 1, wherein the temporal information for an image is a timestamp.

7. The method according to claim 1, wherein the transferring transfers the subsequently received images stored in the second storage to the first storage when the temporal information of the first previous image is anterior to the temporal information of the second previous image.

8. The method according to claim 1, further comprising, when the number of subsequently received images in the second storage exceeds a predetermined threshold before the determined degree of similarity with the second previous image is achieved, removing the subsequently received images from the second storage.

* * * * *